US012679932B2

(12) United States Patent
Anderson et al.

(10) Patent No.: US 12,679,932 B2
(45) Date of Patent: Jul. 14, 2026

(54) POLYAMIDE COMPOSITION AND ARTICLE MADE THEREFROM WITH IMPROVED MOLD SHRINKAGE

(71) Applicant: SYENSQO SPECIALTY POLYMERS USA, LLC, Alpharetta, GA (US)

(72) Inventors: Lindsey Anderson, Cumming, GA (US); Vijay Gopalakrishnan, Dunwoody, GA (US); Lee Carvell, Cumming, GA (US)

(73) Assignee: SYSENSQO SPECIALTY POLYMERS USA, LLC, Alpharetta, GA (US)

( * ) Notice: Subject to any disclaimer, the term of this patent is extended or adjusted under 35 U.S.C. 154(b) by 455 days.

(21) Appl. No.: 18/264,442

(22) PCT Filed: Feb. 25, 2022

(86) PCT No.: PCT/EP2022/054747

§ 371 (c)(1),
(2) Date: Aug. 7, 2023

(87) PCT Pub. No.: WO2022/180195

PCT Pub. Date: Sep. 1, 2022

(65) Prior Publication Data

US 2024/0052101 A1 Feb. 15, 2024

Related U.S. Application Data

(60) Provisional application No. 63/153,974, filed on Feb. 26, 2021.

(30) Foreign Application Priority Data

Jun. 29, 2021 (EP) .................................... 21182555

(51) Int. Cl.
*C08G 69/26* (2006.01)
*C08G 69/10* (2006.01)
(Continued)

(52) U.S. Cl.
CPC ........... *C08G 69/265* (2013.01); *C08G 69/10* (2013.01); *C08K 3/40* (2013.01); *C08L 77/06* (2013.01);
(Continued)

(58) Field of Classification Search
None
See application file for complete search history.

(56) References Cited

U.S. PATENT DOCUMENTS

2016/0130439 A1 5/2016 Koch et al.
2017/0058123 A1 3/2017 Sütterlin et al.
(Continued)

FOREIGN PATENT DOCUMENTS

CA 3086274 A1 * 6/2019
EP 2767555 A1 8/2014
(Continued)

OTHER PUBLICATIONS

Murphy J., "Additives for Plastics Handbook", 2nd Edition, 2001, Chapter 5.2.3., p. 43-48—Elsevier Advanced Technology.
(Continued)

*Primary Examiner* — Tae H Yoon
(74) *Attorney, Agent, or Firm* — Beatrice C. Ortego

(57) ABSTRACT

Described herein is a polyamide composition comprising two polyamides and glass fiber, wherein one of the polyamides is a polyphthalamide formed by polycondensation from various monomers: dicarboxylic acid(s) with diamine (s) and/or amino acid(s), wherein at least one monomer contains a cyclohexyl group. It was surprisingly discovered that the polyamide composition has improved warpage
(Continued)

and/or mold shrinkage properties, excellent mechanical performance and high Tg and/or Tm. Due to the excellent performance, the polyamide composition is suitable for molding and can be desirably incorporated into mobile electronic device applications.

18 Claims, 2 Drawing Sheets

(51) Int. Cl.

| | |
|---|---|
| ***C08K 3/40*** | (2006.01) |
| ***C08L 77/06*** | (2006.01) |
| *C08K 7/14* | (2006.01) |

(52) U.S. Cl.

CPC ............ *C08G 2120/00* (2013.01); *C08K 7/14* (2013.01); *C08K 2201/002* (2013.01); *C08L 2205/025* (2013.01)

(56) References Cited

U.S. PATENT DOCUMENTS

| | | | |
|---|---|---|---|
| 2017/0107326 | A1 | 4/2017 | Bayer et al. |
| 2020/0024395 | A1 | 1/2020 | Capelot |

FOREIGN PATENT DOCUMENTS

| | | | |
|---|---|---|---|
| EP | 3156435 | A1 | 4/2017 |
| EP | 3358411 | A1 | 8/2018 |
| EP | 3392290 | A1 | 10/2018 |
| EP | 3004238 | B1 | 12/2019 |
| WO | WO 1997043330 | A1 | 11/1997 |
| WO | WO 2015096196 | A1 | 7/2015 |
| WO | WO 2018172717 | A1 | 9/2018 |
| WO | WO 2019147457 | A2 | 8/2019 |
| WO | WO 2021037850 | A1 | 3/2021 |

OTHER PUBLICATIONS

Wallenberger, F. T; Bingham, P. A. (Eds.)., "Fiberglass and Glass Technology", 2010, XIV, chapter 5, p. 197-225, Springer.

ASTM D150-18, "Standard Test Methods for AC Loss Characterisitcs and Permittivity (Dielectric Constant) of Solid Electrical Insulation", 2018, p. 1-20.

ASTM D2343-09, "Standard Test Method for Tensile Properties of Glass Fiber Strands, Yarns, and Rovings Used in Reinforced Plastics", 2009, p. 1-7.

ASTM D3418-12, Standard Test Method for Transition Temperatures and Enthalpies of Fusion and Crystallization of Polymers by Differential Scanning Calorimetry, 2012, p. 1-7.

* cited by examiner

POLYAMIDE COMPOSITION AND ARTICLE MADE THEREFROM WITH IMPROVED MOLD SHRINKAGE

CROSS-REFERENCE TO RELATED APPLICATIONS

This application is a U.S. national stage entry under 35 U.S.C. § 371 of International Application No. PCT/EP2022/054747 filed on Feb. 25, 2022, which claims priority to U.S. provisional application No. 63/153,974 filed on Feb. 26, 2021 and to European patent application No. 21182555.9 filed on Jun. 29, 2021, the whole content of these applications being incorporated herein by reference for all purposes.

TECHNICAL FIELD

The present invention relates to polyamide compositions with improved shrinkage and warpage properties and excellent mechanical properties, comprising a combination of polyamides and glass fiber. These polyamide compositions are suitable for the production of molded articles.

BACKGROUND

Polyamide molded articles are broadly used in the engineering field, in particular for electronic components as well as components in the automotive field. Due to the demand for molded articles with a reduced weight but a high mechanical strength, these articles are in general reinforced by fillers, in particular fibrous fillers to increase stiffness. However fibrous fillers can often result in polyamide compositions that exhibit undesirable degrees of anisotropic shrinkage upon molding.

Polyphthalamides in particular are regarded for their high temperature performance, which stems from their high glass transition temperature Tg and high melting temperature Tm. However due to the semi-crystalline nature of these materials, they often suffer from significant mold shrinkage.

It is thus desirable to obtain mobile device components that are made from polyamide compositions having excellent mechanical properties and reduced mold shrinkage and low anisotropic warpage (i.e., good dimensional stability).

By “warpage” is meant the deformation of molded parts in one or more directions that may be caused by anisotropic shrinkage of the resin during molding.

SUMMARY

A first aspect of the present invention is directed to a polyamide composition comprising a polyamide (PA1), a polyamide (PA2), and a glass fiber. The polyamide composition may further comprise an optional reinforcing agent which is different than the glass fiber and optional components (additives).

In particular the polyamide composition comprises:

a polyamide (PA1), a polyamide (PA2) having a glass transition temperature Tg which is lower than the Tg of the polyamide (PA1) and/or having a melting temperature Tm which is lower than the Tm of the polyamide (PA1), and from 15 percent by weight (wt. %) to 60 wt. % of a glass fiber, said wt. % being based on the total weight of the polyamide composition, wherein the polyamide composition has a PA1 weight ratio of at least 0.05 and at most 0.95, said PA1 weight ratio being calculated as the weight of PA1 in the polyamide composition based on the combined weights of PA1 and PA2 in the polyamide composition.

The polyamide (PA1) in the polyamide composition is a copolyamide comprising:

recurring units ($R_{PA1}$) of formula (1), ($R_{PA2}$) of formula (2), and ($R_{PA3}$) of formula (3) or (4):

(1)

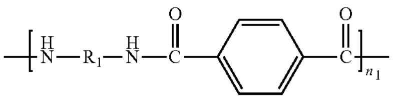

(2)

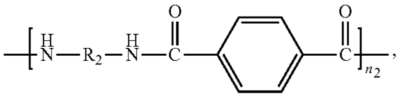

(3)

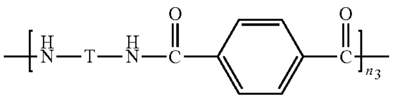

(4)

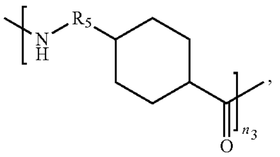

wherein $n_1$ to $n_3$ are mol. % of recurring units ($R_{PA1}$), ($R_{PA2}$) and ($R_{PA3}$), respectively ($n_1+n_2+n_3 \leq 100$ mol. %);

or comprising:

recurring units (($R_{PA1}$) of said formula (1), ($R_{pA2}$) of said formula (2), ($R_{PA3*}$) of formula (5), and ($R_{PA4*}$) of formula (6), (5)

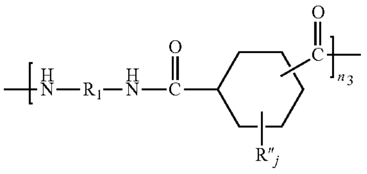

(6)

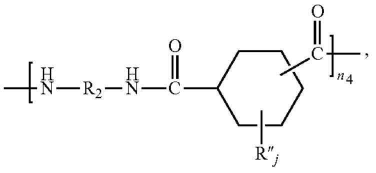

wherein $n_1$ to $n_4$ are mol. % of recurring units ($R_{PA1}$) ($R_{PA2}$), ($R_{PA3*}$), and ($R_{PA4*}$), respectively ($n_1+n_2+n_3+n_4 \leq 100$ mol. %);

and wherein $R_1$ is a $C_4$ to $C_8$ aliphatic alkyl, preferably a $C_6$ aliphatic alkyl group;

$R_2$ is a $C_9$ to $C_{12}$ aliphatic alkyl group, preferably a $C_{10}$ aliphatic alkyl group;

$R_5$ is a $C_1$ to $C_3$ alkyl group, preferably a C1 alkyl group;

R", at each location, is independently selected from the group consisting of an alkyl, an aryl, an alkali or alkaline earth metal sulfonate, an alkyl sulfonate, and a quaternary ammonium;

j is an integer from 0 to 10;

T in Formula (3) is represented by either one of the following formulae (7) or (8):

(7)

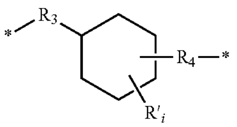

(8)

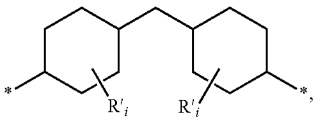

wherein $R_3$ and $R_4$, are independently selected from the group consisting of a bond and a $C_1$ to $C_{10}$ alkyl groups;

R', at each location, is independently selected from the group consisting of an alkyl, an aryl, an alkali or alkaline earth metal sulfonate, an alkyl sulfonate, and a quaternary ammonium; and each i is an independently selected integer from 0 to 10; and the '*' in Formulae (7) and (8) denotes a bond to one of the two explicit nitrogen atoms in Formula (3).

In some embodiments, when the polyamide (PA1) comprises recurring units ($R_{PA1}$) of formula (1), ($R_{PA2}$) of formula (2), and ($R_{PA3}$) of formula (3) or (4), $n_1+n_2+n_3$ is at least 50 mol. % based on the total number of recurring units in the polyamide (PA1), and $n_3$ for ($R_{PA3}$) is greater than 0.5 mol. %.

In some embodiments, when the polyamide (PA1) comprises recurring units ($R_{PA1}$) of formula (1), ($R_{PA2}$) of formula (2), ($R_{PA3*}$) of formula (5), and ($R_{PA4*}$) of formula (7), $n_1+n_2+n_3+n_4$ is at least 50 mol. % based on the total number of recurring units in the polyamide (PA1), and $n_3$ for ($R_{PA3*}$) and/or $n_4$ for ($R_{PA4*}$) is greater than 0.5 mol. %.

In some embodiments, the polyamide (PA1) is preferably a copolyamide comprising recurring units ($R_{PA1}$) of formula (1), ($R_{PA2}$) of formula (2), and ($R_{PA3}$) of formula (3), wherein $R_1$ is a $C_6$ aliphatic alkyl group; $R_2$ is a $C_{10}$ aliphatic alkyl group; T is represented by the formula (7); $R_3$ and $R_4$ are a $C_1$ alkyl group; and i=0.

In some embodiments, the recurring units ($R_{PA1}$) and ($R_{PA2}$) are formed from polycondensation of hexamethylenediamine and 1,10-diaminodecane with terephthalic acid.

In some embodiments, the recurring unit ($R_{PA3}$) is formed from polycondensation of terephthalic acid with a bis(aminomethyl)cyclohexane ("BAC"), that is to say, either 1,3-bis(aminomethyl)cyclohexane ("1,3-BAC") or 1,4-bis(aminomethyl)cyclohexane ("1,4-BAC"), preferably 1,3-BAC.

In some embodiments, the recurring unit ($R_{PA3}$) is formed from the polycondensation of 4-aminomethylcyclohexanecarboxylic acid ("4-AMCC").

In some embodiments, the recurring unit ($R_{PA3*}$) is formed from the polycondensation of hexamethylenediamine (HMDA) with 1,4-cyclohexane dicarboxylic acid ("1,4-CHDA").

In some embodiments, the recurring unit ($R_{PA4*}$) is formed from the polycondensation of 1,10-diaminodecane with 1,4-CHDA.

In some embodiments, the recurring units ($R_{PA3*}$) and ($R_{PA4*}$) are formed from the polycondensation of HMDA and 1,10-diaminodecane with 1,4-CHDA.

In some embodiments, the polyamide composition has a PA1 weight ratio of at least 0.1 or at least 0.15, or at least 0.2, or at least 0.3 and/or of at most 0.9, or at most 0.85, or at most 0.8, or at most 0.75, or at most 0.7, or at most 0.65, or at most 0.6, said PA1 weight ratio being calculated as the weight of PA1 in the polyamide composition based on the combined weights of PA1 and PA2 in the polyamide composition.

In some embodiments, the polyamide (PA2) has a glass transition temperature Tg of at least 50° C., or at least 55° C., or at least 60° C., or at least 70° C., or at least 80° C., and/or a melting temperature of at least 220° C., or or at least 225° C., or at least 230° C.

In some embodiments, the polyamide (PA2) comprises a semi-aromatic polyamide, preferably a polyphthalamide.

In some embodiments, the semi-aromatic polyamide in the polyamide (PA2) is selected from the group consisting of PA10,T/10,I; PA10,T; PA6,T/6,I; PA6,T; PA9,T; PAMXD6; PAPXD10; and any combination thereof.

In some embodiments, the polyamide (PA2) may comprise an aliphatic polyamide. In some such embodiments, the aliphatic polyamide in the second polyamide (PA2) may be selected from the group consisting of PA6,10; PA10,10; PA12; PA5,10; PA10,12; and any combination thereof.

In alternate embodiments, the polyamide (PA2) may exclude an aliphatic polyamide.

In some embodiments, the polyamide composition excludes any polyamide which has a Tg less than 50° C. and/or a Tm less than 220° C.

In yet other embodiments, the polyamide composition excludes any polyamide which has a Tg less than 80° C. and/or a Tm less than 230° C.

In some embodiments, the glass fiber concentration in the polyamide composition is preferably from 20 wt. % to 55 wt. %, more preferably from 30 wt. % to 55 wt. %, based on the total weight of the polyamide composition.

In some embodiments, the glass fiber is a round or flat glass fiber selected from the group consisting of:

E-glass fiber;

low $D_k$ glass fiber having a dielectric constant of 4.0 to 5.5 at a frequency of 1 MHz measured according to ASTM D150;

high modulus glass fiber having a tensile modulus of at least 76 GPa as measured according to ASTM D2343; and combinations thereof.

In some embodiments, the polyamide composition further comprises at least one optional component (also called additive) selected from the group consisting of tougheners, plasticizers, light stabilizers, ultra-violet stabilizers, heat stabilizers, pigments, dyes, antistatic agents, flame retardants, impact modifiers, lubricants, nucleating agents, antioxidants, processing aids, and any combination of two or more thereof, preferably at least one impact modifer.

In some embodiments, the polyamide composition has a Tg value being from the Tg value of polyamide (PA1) to the Tg value of polyamide (PA2) and has a Tm value being from the Tm value of polyamide (PA1) to the Tm value of polyamide (PA2).

In some embodiments, the polyamide composition may have a glass transition temperature Tg of at least 50° C. and/or no more than 150° C., wherein the Tg is measured according to ASTM D3418. In some embodiments, the polyamide composition may have a melting temperature Tm of at least 180° C. and/or no more than 340° C., wherein the Tm is measured according to ASTM D3418.

A second aspect of the present invention pertains to a method for making the polyamide composition according to the invention, said method comprising melt-blending the polyamide (PA1), the polyamide (PA2), the glass fiber and any optional components such as a reinforcing agent different than the glass fiber, a heat stabilizer, an impact modifier, a UV stabilizer, a pigment, etc.

A third aspect of the present invention pertains to a molded article comprising the polyamide composition according to the invention. This molded article has a reduced transverse shrinkage compared to polyamide compositions containing only PA1 or only PA2, the other components being the same in the polyamide compositions.

A fourth aspect of the present invention pertains to a mobile electronic device component comprising the polyamide composition according to the invention, preferably, the mobile electronic device component being an antenna, an antenna window, an antenna housing or a mobile electronic housing.

Another aspect of the present invention relates to a method for reducing warpage and/or mold shrinkage in transverse direction of a molded article, comprising blending the polyamide (PA1) and the polyamide (PA2) with the glass fiber and optional components to form a molding composition before subjecting the molding composition to molding, preferably injection molding, to form the molded article.

The various aspects, advantages, and features of the invention will be more readily understood and appreciated by reference to the detailed description and examples.

DEFINITIONS

Figure 1:
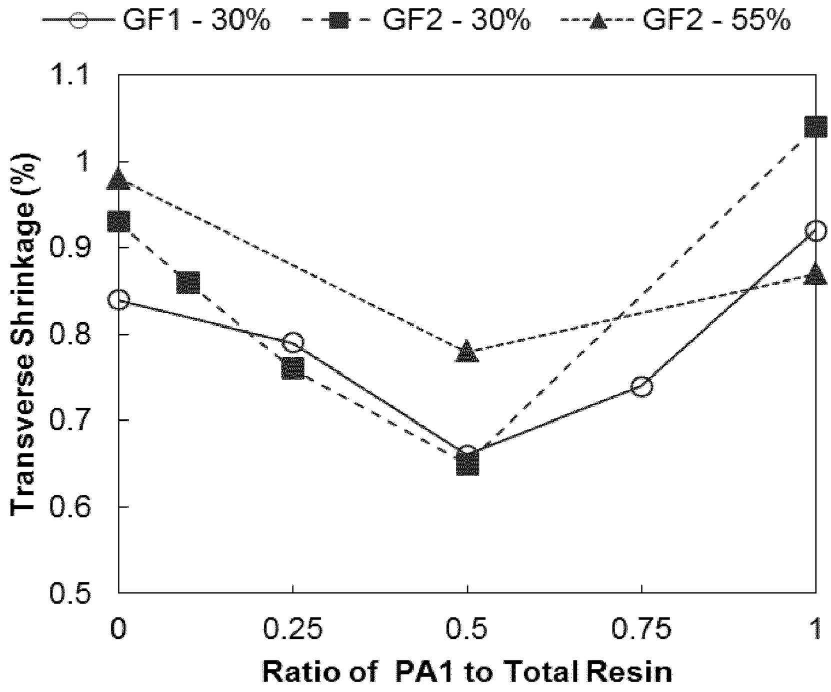
FIG. 1 represents the transverse mold shrinkage of different polyamide blend compositions using two different types of glass fiber according to the present invention, with respect to the PA1 weight ratio to total PA1+PA2 content.

In the present descriptive specification, some terms are intended to have the following meanings.

As used herein, polyamides are generally obtained by polycondensation between at least one aromatic or aliphatic saturated diacid and at least one aliphatic saturated or aromatic primary diamine, a lactam, an amino-acid or a mixture of these different monomers.

As used herein, a polyphthalamide (PPA) is generally obtained by polycondensation between at least one diacid and at least one diamine in which at least 55 mol. % of the diacid portion of the repeating unit in the polymer chain is terephthalic acid and/or isophthalic acid, and in which the diamine is aliphatic.

As used herein, an aliphatic polyamide polymer includes at least 50 mol. % of a recurring unit which has an amide bond (—NH—CO—) and is free of any aromatic groups. Put another way, both the diacid portion and the diamine, lactam or amino acid portion forming the polyamide's recurring units through polycondensation are free of any aromatic groups.

As used herein, concentration of recurring units in mol. % refers to the concentration relative to the total number of recurring unit in the polyamide (PA1), unless explicitly stated otherwise.

Unless specifically limited otherwise, the term "alkyl", as well as derivative terms such as "alkoxy", "acyl" and "alkylthio", as used herein, include within their scope linear chain, branched chain and cyclic moieties. Examples of alkyl groups are methyl, ethyl, 1-methylethyl, propyl, 1,1-dimethylethyl, and cyclo-propyl. Unless specifically stated otherwise, each alkyl and aryl group may be unsubstituted or substituted with one or more substituents selected from but not limited to halogen, hydroxy, sulfo, $C_1$-$C_6$ alkoxy, $C_1$-$C_6$ alkylthio, $C_1$-$C_6$ acyl, formyl, cyano, $C_6$-$C_{15}$ aryloxy or $C_6$-$C_{15}$ aryl, provided that the substituents are sterically compatible and the rules of chemical bonding and strain energy are satisfied. The term "halogen" or "halo" includes fluorine, chlorine, bromine and iodine, with fluorine being preferred.

As used herein, the term "aryl" refers to a phenyl, indanyl or naphthyl group. The aryl group may comprise one or more alkyl groups, and are called sometimes in this case "alkylaryl"; for example may be composed of an aromatic group and two $C_1$-$C_6$ groups (e.g. methyl or ethyl). The aryl group may also comprise one or more heteroatoms, e.g. N, O or S, and are called sometimes in this case "heteroaryl" group; these heteroaromatic rings may be fused to other aromatic systems. Such heteroaromatic rings include, but are not limited to furanyl, thienyl, pyrrolyl, pyrazolyl, imidazolyl, triazolyl, isoxazolyl, oxazolyl, thiazolyl, isothiazolyl, pyridyl, pyridazyl, pyrimidyl, pyrazinyl and triazinyl ring structures. The aryl or heteroaryl substituents may be unsubstituted or substituted with one or more substituents selected from but not limited to halogen, hydroxy, $C_1$-$C_6$ alkoxy, sulfo, $C_1$-$C_6$ alkylthio, $C_1$-$C_6$ acyl, formyl, cyano, $C_6$-$C_{15}$ aryloxy or $C_6$-$C_{15}$ aryl, provided that the substituents are sterically compatible and the rules of chemical bonding and strain energy are satisfied.

As used herein, a 'semi-crystalline' polyamide comprises a heat of fusion ("$\Delta H_f$") of at least 5 Joules per gram (J/g) measured using differential scanning calorimetry at a heating rate of 20° C./min. Similarly, as used herein, an amorphous polyamide comprises a $\Delta H_f$ of less than 5 J/g g measured using differential scanning calorimetry at a heating rate of 20° C./min. $\Delta H_f$ can be measured according to ASTM D3418. In some embodiments, the $\Delta H_f$ is at least 20 J/g, or at least 30 J/g or at least 40 J/g.

As used herein, when referring to "glass transition temperature", Tg, and "melting temperature", Tm, for the polyamides (PA1), (PA2) and the polyamide composition, the Tg and Tm are preferably measured according to ASTM D3418, unless stated otherwise.

In the present specification, the choice of an element from a group of elements also explicitly describes:

- the choice of two or the choice of several elements from the group,
- the choice of an element from a subgroup of elements consisting of the group of elements from which one or more elements have been removed.

In the passages of the present specification which will follow, any description, even though described in relation to a specific embodiment, is applicable to and interchangeable with other embodiments of the present disclosure. Each embodiment thus defined may be combined with another embodiment, unless otherwise indicated or clearly incompatible. In addition, it should be understood that the elements and/or the characteristics of a composition, a product or article, a process or a use, described in the present specification, may be combined in all possible ways with the other elements and/or characteristics of the composition, product or article, process or use, explicitly or implicitly, this being done without departing from the scope of the present description.

In the present specification, the description of a range of values for a variable, defined by a bottom limit, or a top limit, or by a bottom limit and a top limit, also comprises the embodiments where the variable is chosen, respectively, within the range of values: excluding the bottom limit, or excluding the top limit, or excluding the bottom limit and the top limit. Any recitation herein of numerical ranges by endpoints includes all numbers subsumed within the recited ranges as well as the endpoints of the range and equivalents.

The term "comprising" includes "consisting essentially of" and also "consisting of".

The use of the singular 'a' or 'one' herein includes the plural unless specifically stated otherwise.

DETAILED DESCRIPTION OF PREFERRED EMBODIMENTS

When the polyamide composition comprises the polyamide (PA1), the polyamide (PA2), the glass fiber, and optional components, in which the polyamide (PA1) comprises a polyphthalamide formed by polycondensation from various monomers: dicarboxylic acids with diamines and/or amino acids, wherein at least one monomer contains a cyclohexyl group, it was surprisingly found that the blending of such polyamide (PA1) with (PA2) and glass fiber would yield a molding composition with improved mold shrinkage and/or warpage properties while maintaining the mechanical performance and high Tg and/or Tm. The warpage is the absolute value of the percent shrinkage in the transverse direction minus the percent shrinkage in the flow direction of a molded part made from the polyamide composition, both % shrinkage % being preferably determined according to ASTM D955.

In some embodiments, the polyamide composition has a Tg value being from the Tg value of polyamide (PA1) to the Tg value of polyamide (PA2) and has a Tm value being from the Tm value of polyamide (PA1) to the Tm value of polyamide (PA2). Preferably the polyamide composition may have a Tg of at least 50° C. and/or no more than 150° C.; and a Tm of at least 180° C. and/or no more than 340° C.

In some embodiments, the polyamide composition has a Tg of at least 90° C., or at least 100° C., at least 110° C. Additionally or alternatively, in some embodiment, the polyamide composition has a Tg of no more than 150° C., no more than 140° C., no more than 135° C., or no more than 130° C. In some embodiments, the polyamide composition has a Tg of from 100° C. to 150° C., or from 110° C. to 140° C., or from 110° C. to 135° C.

In some embodiments, the polyamide composition has a melting temperature Tm of at least 280° C., or at least 285° C., or at least 290° C. Additionally or alternatively, in some embodiments, the polyamide composition has a Tm of no more than 340° C., or no more than 335° C., or no more than 330° C. In some embodiments, the polyamide composition has a Tm of from 280° C. to 340° C., from 285° C. to 335° C., or from 290° C. to 330° C.

In some embodiments when the polyamide (PA2) consists of one or more aliphatic polyamides, the polyamide composition may have a Tg of at least 50° C. and/or no more than 100° C. In such embodiments, the polyamide composition may have a Tm of at least 180° C. and/or no more than 310° C.

In some embodiments, the polyamide composition comprising both the polyamides (PA1) and (PA2) has a lower mold shrinkage (in %) in transverse direction, determined according to ASTM D955, compared to a similar composition but only comprising the polyamide (PA1) or the polyamide (PA2), while the glass fiber and optional components being the same.

In some embodiments, the polyamide composition has a mold shrinkage (in %) in transverse direction, determined according to ASTM D955, of at most 0.83%, or at most 0.82%, or at most 0.81%, or at most 0.80%, or at most 0.79%.

In some embodiments, the polyamide composition comprising both the polyamides (PA1) and (PA2) has a lower warpage (in %) compared to a similar composition but only comprising the polyamide (PA1) or the polyamide (PA2), with the glass fiber and optional components being the same, when the mold shrinkages (in %) in flow and transverse direction are determined according to ASTM D955.

Polyamide Component (PA1)

The polyamide composition comprises a first polyamide (PA1).

In some embodiments, the polyamide (PA1) is a copolyamide which may comprise three (3) recurring units ($R_{PA1}$) to ($R_{PA3}$), formed from the polycondensation of diamine(s) and/or amino acid(s) with dicarboxylic acids(s). The polyamide (PA1) can have additional recurring units, distinct from recurring units ($R_{PA1}$) to ($R_{PA3}$).

In some such embodiments, recurring units ($R_{PA1}$) are represented by the formula (1), ($R_{pA2}$) represented by the formula (2), and ($R_{PA3}$) represented by either one of the formulae (3) and (4), $n_1$ to $n_3$ being mol. % of recurring units ($R_{PA1}$) to ($R_{PA3}$), respectively.

In some such embodiments, $n_1+n_2+n_3$ is at least 50 mol. %, or at least 60 mol. %, or at least 70 mol. %, or at least 80 mol. %, or at least 90 mol. %, or at least 95 mol. %, or at least 99 mol. %, based on the total number of recurring units in the polyamide (PA1). For example, with respect to recurring units ($R_{PA1}$) to ($R_{PA3}$) described above, $n_1+n_2+n_3 \leq$; 100 mol. %. In some such embodiments, $n_3$ for ($R_{PA3}$) is greater than 0.5 mol. %; or from 1 mol. % to 10 mol. %, preferably from 3 mol. % to 10 mol. %. In some such embodiments, $n_1$ for ($R_{PA1}$) is preferably greater than $n_2$ for ($R_{pA2}$). In some embodiments, $n_1$ for ($R_{PA1}$) may be from 55 mol. % to 75 mol. % and $n_2$ from 25 mol. % to 45 mol. %. In some embodiments, $n_1$ for ($R_{PA1}$) is from 60 mol. % to 70 mol. %. In some embodiments, $n_2$ for ($R_{pA2}$) is from 30 mol. % to 45 mol. %, preferably from 25 mol. % to 38 mol. %, most preferably from 30 mol. % to 38 mol. %.

$R_1$ is a $C_4$ to $C_8$ aliphatic alkyl, preferably a $C_6$ aliphatic alkyl group.

$R_2$ is a $C_9$ to $C_{12}$ aliphatic alkyl group, preferably a $C_{10}$ aliphatic alkyl group.

$R_5$ is a $C_1$ to $C_3$ alkyl group, preferably a $C_1$ alkyl group.

T is represented by either one of the following formulae (7) and (8), where $R_3$ and $R_4$, are independently selected from the group consisting of a bond and a $C_1$ to $C_{10}$ alkyl groups; R', at each location, is independently selected from the group consisting of an alkyl, an aryl, an alkali or alkaline earth metal sulfonate, an alkyl sulfonate, and a quaternary ammonium; and each i is an independently selected integer from 0 to 10; and the '*' denotes a bond to one of the two explicit nitrogen atoms in Formula (3). Preferably, T is represented by Formula (7), preferably where the —$R_4$— group is in meta (1,3-) position relative to the —$R_3$— group. Additionally or alternatively, in some embodiments, each i is zero.

In one embodiment, recurring units ($R_{PA1}$) and ($R_{PA2}$) are formed from the polycondensation of hexamethylenediamine (HMDA) and 1,10-diaminodecane with terephthalic acid. In one such embodiment, recurring unit ($R_{PA3}$) is formed from the polycondensation of either 1,3-BAC or 1,4-BAC, preferably 1,3-BAC, with terephthalic acid. In another such embodiment, recurring unit ($R_{PA3}$) is formed from the polycondensation of 4-AMCC.

In some alternate embodiments, the polyamide (PA1) may include four (4) recurring units: recurring units ($R_{PA1}$) represented by the formula (1), ($R_{PA2}$) represented by the formula (2), ($R_{PA3*}$) represented by the formula (5) and ($R_{PA4*}$) represented by the formula (8), where $R_1$, $R_2$ are defined above; R", at each location, is independently selected from the group consisting of an alkyl, an aryl, an alkali or alkaline earth metal sulfonate, an alkyl sulfonate, and a quaternary ammonium; and j is an integer from 0 to 10; and where $n_1$ to $n_4$ are mol. % of recurring units ($R_{PA1}$) to ($R_{PA4*}$), respectively.

Preferably, $n_1+n_2+n_3+n_4$ is at least 50 mol. %, or at least 60 mol. %, or at least 70 mol. %, or at least 80 mol. %, or at least 90 mol. %, or at least 95 mol. %, or at least 99 mol. %, based on the total number of recurring units in the polyamide (PA1). For example, with respect to recurring units ($R_{PA1}$) to ($R_{PA4*}$), described above, $n_1+n_2+n_3+n_4 \leq$; 100 mol. %. In some embodiments, $n_3$ for ($R_{PA3*}$) and/or $n_4$ for ($R_{PA4*}$) is greater than 0.5 mol. %; or from 1 mol. % to 10 mol. %, preferably from 3 mol. % to 10 mol. %. In some embodiments, $n_1$ for ($R_{PA1}$) may be from 55 mol. % to 75 mol. % and $n_2$ from 25 mol. % to 45 mol. %. In some embodiments, $n_1$ for ($R_{PA1}$) is from 60 mol. % to 70 mol. %. In some embodiments, $n_2$ for ($R_{pA2}$) is from 30 mol. % to 45 mol. %, preferably from 25 mol. % to 38 mol. %, most preferably from 30 mol. % to 38 mol. %.

Preferably, in each of Formulae (5) and (6), the explicit —COO— groups about the cyclohexyl ring are relatively positioned in the meta position (1,3-) or the para position (1,4-), most preferably in the para position. Additionally or alternatively, in some embodiments, j is zero. In one embodiment, recurring units ($R_{PA1}$) and ($R_{PA2}$) are formed from the polycondensation of HMDA and 1,10-diaminodecane with terephthalic acid, and recurring units ($R_{PA3*}$) and ($R_{PA4*}$) are formed from the polycondensation of HMDA and 1,10-diaminodecane with 1,4-CHDA.

In some embodiments, the polyamide composition has a PA1 weight ratio of at least 0.05, or at least 0.1 or at least 0.15, or at least 0.2, or at least 0.3 and/or of at most 0.95, or at most 0.9, or at most 0.85, or at most 0.8, or at most 0.75, or at most 0.7, or at most 0.65, or at most 0.6, said PA1 weight ratio being calculated as the weight of PA1 in the polyamide composition based on the combined weights of PA1 and PA2 in the polyamide composition. In some embodiments, the polyamide composition has a PA1 weight ratio of from 0.05 to 0.95, or from 0.1 to 0.9, or from 0.15 to 0.85, or from 0.1 to 0.75, or from 0.2 to 0.8, or from 0.25 to 0.75, or from 0.3 to 0.65, or from 0.3 to 0.6.

In some embodiments, the polyamide (PA1) has a number average molecular weight Mn of from 1,000 g/mol to 40,000 g/mol, from 2,000 g/mol to 35,000 g/mol, from 4,000 to 30,000 g/mol, or from 5,000 g/mol to 20,000 g/mol. The number average molecular weight Mn can be determined by gel permeation chromatography (GPC) using ASTM D5296 with polystyrene standards.

The polyamide (PA1) is semi-crystalline.

In some embodiments, the polyamide (PA1) has a Tg of at least 100° C., at least 110° C., or at least 115° C. Additionally or alternatively, in some embodiment, the polyamide (PA1) has a Tg of no more than 200° C., no more than 180° C., no more than 160° C., no more than 150° C., no more than 140° C., or no more than 135° C. In some embodiments, the polyamide (PA1) has a Tg of from 100° C. to 150° C., or from 110° C. to 140° C., or from 115° C. to 135° C. In some embodiments, the polyamide (PA1) has a Tg of from 100° C. to 200° C., or from 110° C. to 180° C., or from 115° C. to 160° C. In some embodiments, the polyamide (PA1) has a melting temperature Tm of at least 290° C., or at least 300° C., or at least 310° C. Additionally or alternatively, in some embodiments, the polyamide (PA1) has a Tm of no more than 360° C., no more than 350° C., or no more than 340° C. In some embodiments, the polyamide (PA1) has a Tm of from 290° C. to 360° C., from 300° C. to 350° C., or from 310° C. to 340° C.

In some embodiments, the concentration of the polyamide (PA1) in the polyamide composition is at least 3 wt. %, or at least 5 wt. %, or at least 7 wt. %, or at least 10 wt. %, or at least 15 wt. %, or at least 20 wt. %, based on the total weight of the polyamide composition. In additionally or alternative embodiments, the concentration of the polyamide (PA1) in the polyamide composition is at most 85 wt. %, or at most 80 wt. %, or at most 75 wt. %, or at most 70 wt. %, or at most 65 wt. %, or at most 60 wt. %, or at most 50 wt. %, based on the total weight of the polyamide composition.

In some embodiments, the polyamide composition includes a plurality of distinct polyamides (PA1) according to the above description. In some such embodiments, the total concentration of distinct polyamides (PA1) is within the ranges described above.

Polyamide (PA1) Synthesis

The polyamide (PA1) may be formed from the polycondensation of a reaction mixture (RM) including a diamine component (A) and/or an amino acid component (C) and a dicarboxylic acid component (B).

The polyamide (PA1) described herein can be prepared by any conventional method adapted to the synthesis of polyamides and polyphthalamides. Preferably, the polyamide (PA1) is prepared by reacting (by heating) the monomers in presence of less than 60 wt. % of water, preferentially less than 50 wt. %, up to a temperature of at least Tm+10° C., Tm being the melting temperature of the polyamide (PA1), where wt. % is relative to the total weight of the reaction mixture (RM).

In the reaction mixture (RM), preferably, the total concentration of diamines, dicarboxylic acids and amino acids is selected such that [—$NH_2$]/[—COOH] is from 0.9 to 1.1, preferably from 0.95 to 1.05, where [—$NH_2$] and [—COOH] are the number of moles of —$NH_2$ and —COOH groups, respectively, in the reaction mixture (RM).

For ease of reference, as used hereafter, the concentration of a diamine refers to its concentration relative to the total number of moles of diamines in the diamine component (A), unless explicitly noted otherwise. Similarly, as used herein, the concentration of a dicarboxylic acid refers to its concentration relative to the total number of moles of the dicarboxylic acids in the dicarboxylic acid component (B). Additionally, as used herein, the concentration of an amino acid refers to its concentration relative to the total number of moles of dicarboxylic acid component (B). As used herein, "free of" with respect to a monomer in the reaction mixture (RM) means that the indicated monomer has a concentration of less than 0.5 wt. %, preferably less than 0.1 wt. % in the corresponding component, based on the total weight of the reaction mixture. For example, if the reaction mixture (RM) is free of the cycloaliphatic diamine containing a cyclohexyl group, its concentration in the diamine component (A) is less than 0.5 wt. %, preferably less than 0.1 wt. %.

Significantly, at least one of the cycloaliphatic diamine containing a cyclohexyl group, the cycloaliphatic dicarboxylic acid containing a cyclohexyl group, and the $C_8$ to $C_{10}$ cycloaliphatic amino acid containing a cyclohexyl group has a concentration of greater than 0.5 mol. %. Of course, in some embodiments, any two or all of the cycloaliphatic monomers containing a cyclohexyl group can have a concentration greater than 0.5 mol. %. In some embodiments, only one of the three cycloaliphatic monomers containing a cyclohexyl group has a concentration of greater 0.5 mol. %, and the reaction mixture (RM) is free of the other two cycloaliphatic monomers containing a cyclohexyl group.

The diamine component (A) includes all diamines in the reaction mixture (RM) that polycondense with a dicarboxylic acid or amino acid in the reaction mixture (RM) to form recurring units of the polyamide (PA1). Similarly, the dicarboxylic acid component (B) includes all the dicarboxylic acids in the reaction mixture (RM) that polycondense with a diamine or amino acid in the reaction mixture (RM). Further, the amino acid component (C) includes all of the amino acids in the reaction mixture (RM) that polycondense with a diamine, dicarboxylic acid, or amino acid in the reaction mixture (RM).

Diamine Component (A)

The diamine component (A) includes from 55 mol. % to 75 mol. % of a $C_4$ to $C_8$ aliphatic diamine; from 25 mol. % to 45 mol. % of a $C_9$ to $C_{12}$ aliphatic diamine; and 0 mol. % to 10 mol. % of a cycloaliphatic diamine containing a cyclohexyl group, wherein mol. % is relative to the total number of moles of diamines in the diamine component (A). For clarity, the $C_4$ to $C_8$ aliphatic diamine and the $C_9$ to $C_{12}$ aliphatic diamine can be linear or branched aliphatic diamines. Preferably, the $C_4$ to $C_8$ aliphatic diamine and the $C_9$ to $C_{12}$ aliphatic diamines are both linear aliphatic diamines.

In some embodiments, the $C_4$ to $C_8$ aliphatic diamine and the $C_9$ to $C_{12}$ diamine are represented by the following formulae, respectively:

$$H_2N—R_1—NH_2 \quad (9) \text{ and}$$

$$H_2N—R_2—NH_2 \quad (10)$$

where $R_1$ is a $C_4$ to $C_8$ aliphatic alkyl, preferably a $C_6$ aliphatic alkyl group, and $R_2$ is a $C_9$ to $C_{12}$ aliphatic alkyl group, preferably a $C_{10}$ aliphatic alkyl group. In some embodiments, the $C_4$ to $C_8$ aliphatic diamine is selected from the group consisting of 1,4-diaminobutane,1,5-diaminopentane, 2-methyl-1,5-diaminopentane, HMDA, 3-methylhexamethylenediamine, 2,5-dimethylhexamethylenediamine, 1,7-diaminoheptane and 1,8-diaminooctane. In some embodiments, the $C_9$ to $C_{12}$ aliphatic diamine is selected from the group consisting of 2,2,4-trimethyl-hexamethylenediamine, 2,4,4-trimethyl-hexamethylenediamine, 2-ethyl-1,7-diaminoheptane, 2-methyl-1,8-diaminooctane, 2,2,7,7-tetramethyloctamethylenediamine, 1,9-diaminononane, 2-methyl-1,8-diaminooctane, 5-methyl-1,9-diaminononane, 1,10-diaminodecane, 1,11-diaminoundecane, and 1,12-diaminododecane. Preferably, the $C_4$ to $C_8$ aliphatic diamine is HMDA. Preferably, the $C_9$ to $C_{12}$ aliphatic diamine is 1,10-diaminodecane. Most preferably, the $C_4$ to $C_8$ aliphatic diamine is HMDA and the $C_9$ to $C_{12}$ aliphatic diamine is 1,10-diaminodecane.

In some embodiments, the cycloaliphatic diamine containing a cyclohexyl group is represented by one of the following formulae:

(11)

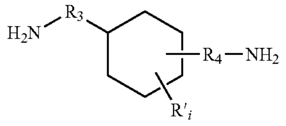

and (12)

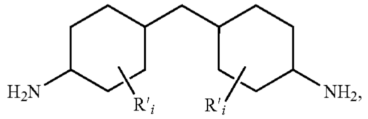

where $R_3$, $R_4$, R' and each i are defined above.

In Formula (11), preferably, the $—R_3—NH_2$ and $—R_4—NH_2$ groups are relatively positioned in the meta position (1,3-) or the para position (1,4-), most preferably in the meta position. In some embodiments, the cycloaliphatic diamine containing a cyclohexyl group is selected from the group consisting of isophorone diamine, 1,3-diaminocyclohexane, 1,4-diaminocyclohexane, bis-p-aminocyclohexylmethane, 1,3-BAC, 1,4-BAC, bis(4-amino-3-methylcyclohexyl) methane and bis(4-aminocyclohexyl)methane. Preferably, the cycloaliphatic diamine containing a cyclohexyl group is 1,3-BAC or 1,4-BAC, most preferably, 1,3-BAC. Of course, the cycloaliphatic diamines containing a cyclohexyl group according to Formula (11) (e.g. 1,3-BAC and 1,4-BAC) can be in a cis or trans conformation. Accordingly, the diamine component (A) can include only the cis isomers, only the trans isomers or a mixture of the cis and the trans isomers.

In some embodiments, the concentration of the $C_4$ to $C_8$ aliphatic diamine is from 60 mol. % to 70 mol. %. In some embodiments, the concentration of the $C_9$ to $C_{12}$ aliphatic diamine is from 30 mol. % to 45 mol. %, preferably from 25 mol. % to 38 mol. %, most preferably from 30 mol. % to 38 mol. %. In some embodiments, the concentration of the cycloaliphatic diamine containing a cyclohexyl group is from 1 mol. % to 10 mol. %, preferably from 3 mol. % to 10 mol. %. In some embodiments, the reaction mixture (RM) is free of the cycloaliphatic diamine containing a cyclohexyl group.

In some embodiments, the total concentration of the $C_4$ to $C_8$ aliphatic diamine, the $C_9$ to $C_{12}$ aliphatic diamine and the cycloaliphatic diamine containing a cyclohexyl group is at least 90 mol. %, or at least 95 mol. %, or at least 98 mol. %, or at least 99 mol. %, or at least 99.5 mol. %, or at least 99.9 mol. %. In some embodiments, the diamine component (A) can include additional diamines, each distinct from each other and from the $C_4$ to $C_8$ aliphatic diamine, the $C_9$ to $C_{12}$ aliphatic diamine and the cycloaliphatic diamine containing a cyclohexyl group. In some such embodiments including additional diamines, the total concentration of $C_4$ to $C_8$ aliphatic diamines, $C_9$ to $C_{12}$ aliphatic diamines; and cycloaliphatic diamines containing a cyclohexyl group are all within the corresponding ranges given above. In other such embodiments including additional diamines, the concentration of each additional diamine is distinct from the ranges given above with respect to the $C_4$ to $C_8$ aliphatic diamines, the $C_9$ to $C_{12}$ aliphatic diamines; and cycloaliphatic diamines containing a cyclohexyl group.

Dicarboxylic Acid Component (B)

The dicarboxylic acid component (B) includes 90 mol. % to 100 mol. % of terephthalic acid; 0 mol. % to 10 mol. % of a $C_6$ to $C_{18}$ aliphatic dicarboxylic acid or a $C_8$ to $C_{18}$ aromatic dicarboxylic acid distinct from terephthalic acid; and 0 mol. % to 10 mol. % of a cycloaliphatic dicarboxylic acid containing a cyclohexyl group, wherein mol. % is relative to the total number of moles of dicarboxylic acids in the dicarboxylic acid component (B). The $C_6$ to $C_{18}$ aliphatic dicarboxylic acid can be a linear or branched aliphatic dicarboxylic acid.

In some embodiments, the $C_6$ to $C_{18}$ aliphatic dicarboxylic acid is selected from the group consisting of 2,2-dimethyl-glutaric acid [$HOOC—C(CH_3)_2—(CH_2)_2—COOH$], adipic acid [$HOOC—(CH_2)_4—COOH$], 2,4,4-trimethyl-adipic acid [$HOOC—CH(CH_3)—CH_2—C(CH_3)_2—CH_2—COOH$], pimelic acid [$HOOC—(CH_2)_5COOH$], suberic acid [$HOOC—(CH_2)_6—COOH$], azelaic acid [$HOOC—(CH_2)_7—COOH$], sebacic acid [$HOOC—(CH_2)_8—COOH$], undecanedioic acid [$HOOC—(CH_2)_9—COOH$], dodecanedioic acid [$HOOC—(CH_2)_{10}—COOH$], tridecanedioic acid [$HOOC—(CH_2)_{11}—COOH$], tetradecanedioic acid [$HOOC—(CH_2)_{12}—COOH$], pentadecanedioic acid [$HOOC—(CH_2)_{13}—COOH$], hexadecanedioic acid [$HOOC—(CH_2)_{14}—COOH$], and octadecanedioic acid [$HOOC—(CH_2)_{16}—COOH$]. Preferably, the $C_6$ to $C_{18}$ aliphatic dicarboxylic acid is adipic acid or sebacic acid, most preferably adipic acid.

In some embodiments, the $C_8$ to $C_{18}$ aromatic dicarboxylic acid distinct from terephthalic acid is selected from the group consisting of phthalic acids, including isophthalic acid (IA) and excluding terephthalic acid (TA), naphthalenedicarboxylic acids (e.g., naphthalene-2,6-dicarboxylic acid), 4,4'-bibenzoic acid, 2,5-pyridinedicarboxylic acid, 2,4-pyridinedicarboxylic acid, 3,5-pyridinedicarboxylic acid, 2,2-bis(4-carboxyphenyl)propane, 2,2-bis(4-carboxyphenyl) hexafluoropropane, 2,2-bis(4-carboxyphenyl)ketone, 4,4'-bis(4-carboxyphenyl)sulfone, 2,2-bis(3-carboxyphenyl) propane, 2,2-bis(3-carboxyphenyl)hexafluoropropane, 2,2-bis(3-carboxyphenyl)ketone, bis(3-carboxyphenoxy) benzene. Preferably, the $C_8$ to $C_{18}$ aromatic dicarboxylic acid is naphthalenedicarboxylic acid or 4,4'-bibenzoic acid.

In some embodiments, the cycloaliphatic dicarboxylic acid containing a cyclohexyl group is represented by the following formula:

(13)

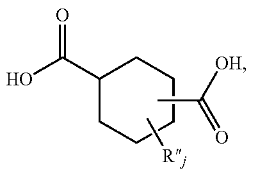

where R" and j are defined above. In Formula (13), preferably, the —C—COOH groups are relatively positioned in the meta position (1,3-) or the para position (1,4-), most preferably in the para position. In some embodiments, the cycloaliphatic carboxylic acid containing a cyclohexyl group is a cyclohexane dicarboxylic acid (CHDA), preferably 1,3-CHDA or 1,4-CHDA, most preferably 1,4-CHDA.

In some embodiments, the concentration of the terephthalic acid is from 92 mol. % to 100 mol. %, preferably 93 mol. % to 100 mol. %. In some embodiments, the concentration of the $C_6$ to $C_{18}$ aliphatic dicarboxylic acid or the $C_8$ to $C_{18}$ aromatic dicarboxylic acid distinct from terephthalic acid is 0 mol. % to 0.5 mol. %, preferably from 0 mol. % to 0.1 mol. %. In some embodiments, the concentration of the cycloaliphatic dicarboxylic acid containing a cyclohexyl group is from 3 mol. % to 10 mol. %, or from 3 mol. % to 9 mol. %. In some embodiments, the dicarboxylic acid component (B) is free one or both of (i) the $C_6$ to $C_{18}$ aliphatic linear and the branched dicarboxylic acid or $C_8$ to $C_{18}$ aromatic dicarboxylic acid distinct from terephthalic and (ii) the cycloaliphatic dicarboxylic acid containing a cyclohexyl group.

In some embodiments, the total concentration of the terephthalic acid, the $C_6$ to $C_{18}$ aliphatic dicarboxylic acid or a $C_8$ to $C_{18}$ aromatic dicarboxylic acid distinct from terephthalic acid, and the cycloaliphatic dicarboxylic acid containing a cyclohexyl group is at least 90 mol. %, at least 95 mol. %, at least 98 mol. %, at least 99 mol. %, at least 99.5 mol. % or at least 99.9 mol. %. In some embodiments, the dicarboxylic acid component (B) can include additional dicarboxylic acids, each distinct from each other and from the terephthalic acid, the $C_6$ to $C_{18}$ aliphatic dicarboxylic acid or a $C_8$ to $C_{18}$ aromatic dicarboxylic acid distinct from terephthalic acid, and the cycloaliphatic dicarboxylic acid containing a cyclohexyl group. In some such embodiments including additional dicarboxylic acids, the total concentration of $C_6$ to $C_{18}$ aliphatic dicarboxylic acid or $C_8$ to $C_{18}$ aromatic dicarboxylic acids distinct from terephthalic acid and the total concentration the cycloaliphatic dicarboxylic acids containing a cyclohexyl group are within the corresponding ranges given above. In other such embodiments including additional dicarboxylic acids, the concentration of each additional dicarboxylic acid is distinct from the ranges given above with respect to the $C_6$ to $C_{18}$ aliphatic dicarboxylic acid or the $C_8$ to $C_{18}$ aromatic dicarboxylic acid distinct from terephthalic acid and the cycloaliphatic dicarboxylic acid containing a cyclohexyl group.

Amino Acid Component (C)

The amino acid component (C) includes 0 mol. % to 9 mol. % of a $C_8$ to $C_{10}$ cycloaliphatic amino acid containing a cyclohexyl group, wherein mol. % is relative to the total number of moles of dicarboxylic acid component (B). In some embodiments, the $C_8$ to $C_{10}$ cycloaliphatic amino acid containing a cyclohexyl group is represented by the following formula:

(14)

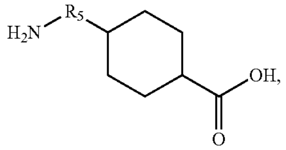

where $R_5$ is a $C_1$ to $C_3$ alkyl group, preferably a $C_1$ alkyl group. Preferably, the $C_8$ to $C_{10}$ cycloaliphatic amino acid containing a cyclohexyl group is 4-AMCC. Of course, the cycloaliphatic amino acid according to formula (14) can be in a cis or trans conformation. Accordingly, the amino acid component (C) can include only the cis isomers, only the trans isomers or a mixture of the cis and the trans isomers.

In some embodiments, the concentration of the a $C_8$ to $C_{10}$ cycloaliphatic amino acid containing a cyclohexyl group is from 1 mol. % to 9 mol. %, preferably from 3 mol. % to 9 mol. %. In some embodiments, the reaction mixture (RM) is free of the $C_8$ to $C_{10}$ cycloaliphatic amino acid containing a cyclohexyl group. In some such embodiments, the amino acid component (C) may or may not contain additional amino acids distinct from the $C_8$ to $C_{10}$ cycloaliphatic amino acid containing a cyclohexyl group. In some embodiments, the reaction mixture (RM) is free of amino acids.

In some embodiments, the total concentration of the $C_8$ to $C_{10}$ cycloaliphatic amino acid containing a cyclohexyl group is at least 90 mol. %, at least 95 mol. %, at least 98 mol. %, at least 99 mol. %, at least 99.5 mol. % or at least 99.9 mol. % relative to the total amount of amino acids in the amino acid component (C). In some embodiments, the amino acid component (C) can include additional amino acids, each distinct from each other and from the $C_8$ to $C_{10}$ cycloaliphatic amino acid. In some such embodiments including additional amino acids, the total concentration of $C_8$ to $C_{10}$ cycloaliphatic amino acids containing a cyclohexyl group is within the corresponding ranges given above. In other such embodiments including additional amino acids, the concentration of each additional $C_8$ to $C_{10}$ cycloaliphatic amino acid is distinct from the range given above with respect to the $C_8$ to $C_{10}$ cycloaliphatic amino acid containing a cyclohexyl group.

The first polyamide (PA1) is preferably selected from the group consisting of PA6,T/10,T/1,3-BAC,T; PA6,T/10,T/1,4-BAC,T; PA6,T/10,T/6,CHDA/10,CHDA; PA6,T/10,T/AMCC; and any combination thereof; more preferably selected from the group consisting of PA6,T/10,T/1,3-BAC,T; PA6,T/10,T/6,CHDA/10,CHDA; and combination thereof.

Polyamide Component (PA2)

The polyamide composition comprises a second polyamide (PA2) which is different than the polyamide (PA1).

In some embodiments, the polyamide (PA2) has a Tg which is lower than the Tg of the polyamide (PA1), preferably at least 5° C. lower, more preferably at least 10° C. lower.

In additional or alternate embodiments, the polyamide (PA2) has a Tm which is lower than the Tm of the polyamide (PA1), preferably at least 5° C. lower, more preferably at least 10° C. lower.

In some embodiments, the second polyamide (PA2) in the polyamide composition excludes any polyamide which has a Tg less than 80° C. and/or a Tm less than 250° C.

In some other embodiments, the second polyamide (PA2) in the polyamide composition excludes any polyamide which has a Tg less than 50° C. and/or a Tm less than 220° C.

In some embodiments, the polyamide (PA2) has a Tg of at least 50° C., or at least 55° C., or at least 60° C., or at least 70° C., or at least 80° C., or at least 90° C., at least 95° C., or at least 100° C. Additionally or alternatively, in some embodiment, the polyamide (PA2) has a Tg of no more than 200° C., no more than 180° C., no more than 160° C., no more than 150° C., no more than 140° C., or no more than 135° C. In some embodiments, the polyamide (PA2) has a Tg of from 80° C. to 150° C., from 100° C. to 140° C., or from 100° C. to 135° C., or from 100° C. to 120° C.

In some embodiments, the polyamide (PA2) has a melting temperature Tm of or at least 220° C., or at least 225° C., at least 230° C., or at least 260° C., or at least 265° C. Additionally or alternatively, in some embodiments, the polyamide (PA2) has a Tm of no more than 360° C., no more than 350° C., or no more than 340° C., or no more than 330° C. In some embodiments the polyamide (PA2) has a Tm of from 230° C. to 360° C., from 260° C. to 350° C., or from 265° C. to 330° C. Tg and Tm can be measured according to ASTM D3418.

In some embodiments, the second polyamide (PA2) may be selected from the group consisting of PA10,T/10,I; PA10,T; PA6,T; PA9,T; PA6,T/6,I; PAMXD6; PAPXD10; PA6,10; PA10,10; PA12; PA5,10; PA10,12; and any combination of two or more thereof.

In some embodiments, the second polyamide (PA2) in the polyamide composition may include, or consist essentially of, at least one polyphthalamide.

In some embodiments, the second polyamide (PA2) may be selected from the group consisting of PA10,T/10,I; PA10,T; PA6,T; PA9,T; PA6,T/6,I; PAMXD6; PAPXD10; and any combination of two or more thereof.

In some embodiments, the second polyamide (PA2) in the polyamide composition may include an aliphatic polyamide.

In some embodiments, the second polyamide (PA2) may be selected from the group consisting of PA6,10; PA10,10; PA12; PA5,10; PA10,12 and any combination of two or more thereof.

In some embodiments, the second polyamide (PA2) in the polyamide composition may exclude an aliphatic polyamide.

In preferred embodiments, the second polyamide (PA2) may be selected from the group consisting of PA10,T/10,I; PA9,T; PA6,10; and any combination thereof.

In some embodiments, the concentration of the second polyamide (PA2) in the polyamide composition is at least at least 3 wt. %, or at least 5 wt. %, or at least 7 wt. %, or at least 10 wt. %, or at least 15 wt. %, or at least 20 wt %, based on the total weight of the polyamide composition. Additionally or alternatively, in some embodiments, the concentration of the second polyamide (PA2) in the polyamide composition is at most 85 wt. %, or at most 80 wt. %, or at most 75 wt. %, or at most 70 wt. %, or at most 65 wt. %, or at most 60 wt. %, or at most 55 wt. %, or at most 50 wt. %, or at most 45 wt. %, or at most 40 wt. %, or at most 35 wt. %, based on the total weight of the polyamide composition.

In some embodiments, the polyamide composition includes a plurality of distinct second polyamides (PA2) according to the above description. In some such embodiments, the total concentration of distinct second polyamides (PA2) is within the ranges described above.

In some embodiments, when the second polyamide (PA2) in the polyamide composition comprises at least one semi-aromatic polyamide and at least one aliphatic polyamide, the weight ratio of the at least one semi-aromatic polyamide is greater than the weight ratio of the at least one aliphatic polyamide, based on the total weight of polyamides in the polyamide composition.

In some embodiments, the polyamide composition does not comprise an aliphatic polyamide.

The second polyamide (PA2) is preferably a semi-crystalline polyamide.

Glass Fiber

The polyamide composition comprises at least one glass fiber.

Glass fibers are silica-based glass compounds that contain several metal oxides which can be tailored to create different types of glass. The main oxide is silica in the form of silica sand; the other oxides such as calcium, sodium and aluminum are incorporated to reduce the melting temperature and impede crystallization.

The glass fibers may be endless fibers or chopped glass fibers.

In some embodiments, the glass fibers have an average length of from 3 mm to 50 mm. In some such embodiments, the glass fibers have an average length of from 3 mm to 10 mm, from 3 mm to 8 mm, from 3 mm to 6 mm, or from 3 mm to 5 mm. In alternative embodiments, the glass fibers have an average length of from 10 mm to 50 mm, from 10 mm to 45 mm, from 10 mm to 35 mm, from 10 mm to 30 mm, from 10 mm to 25 mm or from 15 mm to 25 mm.

In some embodiments, the glass fibers have generally an equivalent diameter of from 5 to 20 μm, preferably of from 5 to 15 μm and more preferably of 5 to 10 μm.

All glass fiber types, such as A, C, D, E, M, S, R, T glass fibers (as described in chapter 5.2.3, pages 43-48 of Additives for Plastics Handbook, 2nd ed, John Murphy), or any mixtures thereof or mixtures thereof may be used.

E, R, S and T glass fibers are well known in the art. They are notably described in Fiberglass and Glass Technology, Wallenberger, Frederick T.; Bingham, Paul A. (Eds.), 2010, XIV, chapter 5, pages 197-225. R, S and T glass fibers are composed essentially of oxides of silicon, aluminium and magnesium. In particular, those glass fibers comprise typically from 62-75 wt. % of $SiO_2$, from 16-28 wt. % of $Al_2O_3$ and from 5-14 wt. % of MgO. On the other hand, R, S and T glass fibers comprise less than 10 wt. % of CaO.

In some embodiments, the glass fiber is a high modulus glass fiber. High modulus glass fibers have an elastic modulus of at least 76 GPa, preferably at least 78 GPa, more preferably at least 80 GPa, and most preferably at least 82 GPa as measured according to ASTM D2343. Examples of high modulus glass fibers include, but are not limited to, S, R, and T glass fibers. A commercially available source of high modulus glass fibers is S-1 and S-2 glass fibers from Taishan and AGY, respectively.

In some embodiments, the glass fiber is a low $D_k$ glass fiber. Low $D_k$ glass fibers have a dielectric constant of from 4.0 to 5.5, from 4.0 to 5.4, from 4.0 to 5.3, from 4.0 to 5.2, from 4.0 to 5.1, or from 4.0 to 5.0, at a frequency of 1 MHz, 600 MHz, 1 GHz and 2.4 GHz. Low $D_k$ glass fibers can also have a low $D_f$ ("low $D_k$/$D_f$ glass fiber"). Such glass fibers have a $D_f$ of rom 0.0005 to 0.001, at a frequency of 1 MHz, 1 GHz, 600 MHz and 2.4 GHz. The $D_f$ and $D_k$ of the glass fibers can be measured according to ASTM D150 (1.0 MHz) and ASTM D2520 (600 MHz, 1.0 GHz and 2.4 GHz).

In some embodiments, the glass fiber is a high modulus and low $D_k$ glass fiber.

The morphology of the glass fiber is not particularly limited. As noted above, the glass fiber can have a circular cross-section ("round glass fiber") or a non-circular cross-section ("flat glass fiber"). Examples of suitable flat glass fibers include, but are not limited to, glass fibers having oval, elliptical and rectangular cross sections.

In some embodiments in which the polyamide composition includes a flat glass fiber, the flat glass fiber has a cross-sectional longest diameter of at least 15 μm, preferably at least 20 μm, more preferably at least 22 μm, still more preferably at least 25 μm. Additionally or alternatively, in some embodiments, the flat glass fiber has a cross-sectional longest diameter of at most 40 μm, preferably at most 35 μm, more preferably at most 32 μm, still more preferably at most 30 μm. In some embodiments, the flat glass fiber has a cross-sectional diameter was in the range of 15 to 35 μm, preferably of 20 to 30 μm and more preferably of 25 to 29 μm. In some embodiments, the flat glass fiber has a cross-sectional shortest diameter of at least 4 μm, preferably at least 5 μm, more preferably at least 6 μm, still more preferably at least 7 μm. Additionally or alternatively, in some embodiments, the flat glass fiber has a cross-sectional shortest diameter of at most 25 μm, preferably at most 20 μm, more preferably at most 17 μm, still more preferably at most 15 μm. In some embodiments, the flat glass fiber has a cross-sectional shortest diameter was in the range of 5 to 20 preferably of 5 to 15 μm and more preferably of 7 to 11 μm.

In some embodiments, the flat glass fiber has an aspect ratio of at least 2, preferably at least 2.2, more preferably at least 2.4, still more preferably at least 3. The aspect ratio is defined as a ratio of the longest diameter in the cross-section of the glass fiber to the shortest diameter in the same cross-section. Additionally or alternatively, in some embodiments, the flat glass fiber has an aspect ratio of at most 8, preferably at most 6, more preferably of at most 4. In some embodiments, the flat glass fiber has an aspect ratio of from 2 to 6, and preferably, from 2.2 to 4.

In some embodiments, in which the glass fiber is a round glass fiber, the glass fiber has an aspect ratio of less than 2, preferably less than 1.5, more preferably less than 1.2, even more preferably less than 1.1, most preferably, less than 1.05. Of course, the person of ordinary skill in the art will understand that regardless of the morphology of the glass fiber (e.g., round or flat), the aspect ratio cannot, by definition, be less than 1.

In some embodiments, the glass fiber is a round or flat glass fiber selected from the group consisting of:

E-glass fiber;

low $D_k$ glass fiber having a dielectric constant of 4.0 to 5.5 at a frequency of 1 MHz measured according to ASTM D150;

high modulus glass fiber having a tensile modulus of at least 76 GPa as measured according to ASTM D2343; and combinations thereof.

In some embodiments, the glass fiber concentration is at least 15 wt. %, or at least 20 wt. %, or at least 25 wt. %, or at least 30 wt. %, based on the total weight of the polyamide composition. In additional or alternate embodiments, the glass fiber concentration is at most 60 wt. %, or at most 55 wt. %, or at most 50 wt. %, or at most 45 wt. %, based on the total weight of the polyamide composition. In some embodiments, the glass fiber concentration is from 15 wt. % to 60 wt. %, or from 20 wt. % to 60 wt. %, or from 25 wt. % to 60 wt. %, or from 30 wt. % to 60 wt %, or from 20 wt. % to 55 wt. %, or from 25 wt. % to 55 wt. %, or from 30 wt. % to 55 wt %, or from 20 wt. % to 50 wt. %, or from 25 wt. % to 50 wt. %, or from 30 wt. % to 50 wt. %, or from 30 wt. % to 45 wt. %, based on the total weight of the polyamide composition.

Optional Component—Other Reinforcing Agent

The polyamide composition may further comprise at least one reinforcing agent which is different than the glass fiber, as described above.

A large selection of reinforcing agents, also called reinforcing fibers or fillers, may be added to the polyamide composition according to the present invention. They can be selected from fibrous and particulate reinforcing agents.

The reinforcing agent may be selected from mineral fillers (such as talc, mica, kaolin, calcium carbonate, calcium silicate, magnesium carbonate), carbon fibers, synthetic polymeric fibers, aramid fibers, aluminum fibers, titanium fibers, magnesium fibers, boron carbide fibers, rock wool fibers, steel fibers, wollastonite, glass balls (e.g., hollow glass microspheres), and a different type of glass fibers, i.e., different than the glass fiber used in the polyamide composition according to the invention.

A fibrous reinforcing filler is considered herein to be a material having length, width and thickness, wherein the average length is significantly larger than both the width and thickness. Generally, such a material has an aspect ratio, defined as the average ratio between the length and the largest of the width and thickness of at least 5, at least 10, at least 20 or at least 50. In some embodiments, the reinforcing fibers (e.g., carbon fibers) have an average length of from 3 mm to 50 mm. In alternative embodiments, the reinforcing fibers have an average length of from 10 mm to 50 mm. The average length of the reinforcing fibers can be taken as the average length of the reinforcing fibers prior to incorporation into the polyamide composition or can be taken as the average length of the reinforcing fiber in the polyamide composition.

A particulate reinforcing agent may be selected from mineral fillers (such as talc, mica, kaolin, calcium carbonate, calcium silicate, magnesium carbonate) or glass balls (e.g., hollow glass microspheres).

The reinforcing agent may be present in the composition in a total amount of at least 15 wt. %, or at least 20 wt. % by weight, or at least 25 wt. %, and/or at most 50 wt. %, or at most 45 wt. %, based on the total weight of the polyamide composition. The reinforcing agent may for example be present in the polyamide composition in an amount ranging between 20 and 50 wt. %, for example between 25 and 50 wt. %, or between 25 and 45 wt. %, based on the total weight of the polyamide composition.

In some embodiments, the polyamide composition excludes a reinforcing agent which is different than the glass fiber, as described above.

In some embodiments, the polyamide composition excludes glass spheres or balls and in particular excludes hollow glass balls.

Other Optional Components (Additives)

In some embodiments, the polyamide composition may include at least one optional component (also called an additive) selected from the group consisting of tougheners, plasticizers, light stabilizers, ultra-violet ("UV") stabilizers, heat stabilizers, pigments, dyes, antistatic agents, flame retardants, impact modifiers, lubricants, nucleating agents, antioxidants, processing aids, and any combination of two or more thereof.

In some embodiments in which the polyamide composition includes one or more optional components, the total concentration of these additives is no more than 15 wt. %, no more than 10 wt. %, no more than 5 wt. %, no more than 1 wt. %, no more 0.5 wt. %, no more than 0.4 wt. %, no more than 0.3 wt. %, no more than 0.2 wt. %, or no more than 0.1 wt. %, based on the total weight of the polyamide composition.

In some embodiments, the polyamide composition includes at least one impact modifier.

Impact modifiers useful herein are not particularly limited, so long as they impart useful properties to the polyamide composition, such as sufficient tensile elongation at yield and break. For example, any rubbery low-modulus functionalized polyolefin impact modifier with a glass transition temperature lower than 0° C. is suitable for this invention. Useful impact modifiers include polyolefins, preferably functionalized polyolefins, and especially elastomers such as SEBS and EPDM.

Useful functionalized polyolefin impact modifiers are available from commercial sources, including maleated polypropylenes and ethylene-propylene copolymers available as EXXELOR™ PO and maleic anhydride-functionalized ethylene-propylene copolymer rubber comprising about 0.6 weight percent pendant succinic anhydride groups, such as EXXELOR® RTM. VA 1801 from the Exxon Mobil Chemical Company; acrylate-modified polyethylenes available as SURLYN®, such as SURLYN® 9920, methacrylic acid-modified polyethylene from the DuPont Company; and PRIMACOR®, such as PRIMACOR® 1410 XT, acrylic acid-modified polyethylene, from the Dow Chemical Company; maleic anhydride-modified styrene-ethylene-butylene-styrene (SEBS) block copolymer, such as KRATON® FG1901 GT or FG1901 X, a SEBS that has been grafted with about 2 weight % maleic anhydride, available from Kraton Polymers; maleic anhydride-functionalized ethylene-propylene-diene monomer (EPDM) terpolymer rubber, such as ROYALTUF® 498, a 1% maleic anhydride functionalized EPDM, available from the Crompton Corporation.

Other functionalized impact modifiers that may also be used in the practice of the invention include ethylene-higher alpha-olefin polymers and ethylene-higher alpha-olefin-diene polymers that have been provided with reactive functionality by being grafted or copolymerized with suitable reactive carboxylic acids or their derivatives such as, for example, acrylic acid, methacrylic acid, maleic anhydride or their esters, and will have a tensile modulus up to about 50,000 psi determined according to ASTM D-638. Suitable higher alpha-olefins include $C_3$ to $C_8$ alpha-olefins such as, for example, propylene, butene-1, hexene-1 and styrene. Alternatively, copolymers having structures comprising such units may also be obtained by hydrogenation of suitable homopolymers and copolymers of polymerized 1-3 diene monomers. For example, polybutadienes having varying levels of pendant vinyl units are readily obtained, and these may be hydrogenated to provide ethylene-butene copolymer structures. Similarly, hydrogenation of polyisoprenes may be employed to provide equivalent ethylene-isobutylene copolymers. The functionalized polyolefins that may be used in the present invention include those having a melt index in the range of about 0.5 to about 200 g/10 min.

Preparation of the Polyamide Composition

The invention further pertains to a method for making the polyamide composition as above detailed, said method comprising melt-blending the first polyamide (PA1), the second polyamide (PA2), the glass fiber, and any optional component(s) such as another reinforcing agent different than the glass fiber, a lubricant, a UV stabilizer, a heat stabilizer, an impact modifier, etc.

Any melt-blending method may be used for mixing polymeric ingredients and non-polymeric ingredients in the context of the present invention.

For example, polymeric ingredients (the polyamide and the functionalized polyolefin) and non-polymeric ingredients may be fed into a melt mixer, such as single screw extruder or twin screw extruder, agitator, single screw or twin screw kneader, or Banbury mixer, and the addition step may be addition of all ingredients at once or gradual addition in batches. When the polymeric ingredient and non-polymeric ingredient are gradually added in batches, a part of the polymeric ingredients and/or non-polymeric ingredients is first added, and then is melt-mixed with the remaining polymeric ingredients and non-polymeric ingredients that are subsequently added, until an adequately mixed composition is obtained.

If the glass fiber or the optional reinforcing agent presents a long physical shape (for example, a long or 'endless' fiber), drawing extrusion molding, poltrusion to form long-fiber pellets or poltrusion to form unidirectional composite tapes may be used to prepare a reinforced composition.

Articles and Applications

Another aspect of the present invention provides the use of the polyamide composition in an article.

The polyamide composition can be desirably incorporated into articles, preferably shaped articles.

The article can notably be used in mobile electronics, LED packaging, electrical and electronic components (including, but not limited to, power unit components for computing, data-system and office equipment and surface mounted technology compatible connectors and contacts), medical device components; and electrical protection devices for mini-circuit breakers, contactors, switches and sockets), automotive components, and aerospace components (including, but not limited to, interior cabin components).

The term "mobile electronic device" is intended to denote an electronic device that is designed to be conveniently transported and used in various locations. Representative examples of mobile electronic devices may be selected from the group consisting of a mobile electronic phone, a personal digital assistant, a laptop computer, a tablet computer, a radio, a camera and camera accessories, a wearable computing device (e.g., a smart watch, smart glasses and the like), a calculator, a music player, a global positioning system receiver, a portable game console and console accessories, a hard drive and other electronic storage devices.

Preferred mobile electronic devices include laptop computers, tablet computers, mobile electronic phones and wearable computing devices, e.g., watches.

Components of mobile electronic devices of interest herein include, but are not limited to, antenna windows, fitting parts, snap fit parts, mutually moveable parts, functional elements, operating elements, tracking elements, adjustment elements, carrier elements, frame elements, switches, connectors, cables, housings, and any other structural part other than housings as used in a mobile electronic devices, such as for example speaker parts. In some embodiments, the device component can be of a mounting component with mounting holes or other fastening device, including but not limited to, a snap fit connector between itself and another component of the mobile electronic device, including but not limited to, a circuit board, a microphone, a speaker, a display, a battery, a cover, a housing, an electrical or electronic connector, a hinge, a radio antenna, a switch, or a switchpad.

In some embodiments, the mobile electronic device can be at least a portion of an input device.

In some embodiments, the mobile electronic device component may also be a mobile electronic device housing. The "mobile electronic device housing" refers to one or more of the back cover, front cover, antenna housing, frame and/or backbone of a mobile electronic device. The housing may be a single article or comprise two or more components. A "backbone" refers to a structural component onto which other components of the device, such as electronics, microprocessors, screens, keyboards and keypads, antennas, battery sockets, and the like are mounted. The backbone may be an interior component that is not visible or only partially visible from the exterior of the mobile electronic device. The housing may provide protection for internal components of the device from impact and contamination and/or damage from environmental agents (such as liquids, dust, and the like). Housing components such as covers may also provide substantial or primary structural support for and protection against impact of certain components having exposure to the exterior of the device such as screens and/or antennas.

In some embodiments, the mobile electronic device housing is selected from the group consisting of a mobile phone housing, an antenna housing, an antenna window, a tablet housing, a laptop computer housing, a tablet computer housing or a watch housing.

In some embodiments, the mobile electronic device component may include, for example, a radio antenna. In this case, the radio antenna can be a WiFi antenna or an RFID antenna. In some such embodiments, at least a portion of the radio antenna is disposed on the polyamide composition. Additionally or alternatively, at least a portion of the radio antenna can be displaced from the polyamide composition.

Examples of automotive components include, but are not limited to, components in automotive electronic components, automotive lighting components (including, but not limited to, motor end caps, sensors, ECU housings, bobbins and solenoids, connectors, circuit protection/relays, actuator housings, Li-ion battery systems, and fuse boxes), traction motor and power electronic components (including, but not limited to, battery packs), electrical battery housings.

The article can be molded from the polyamide composition by any process adapted to thermoplastics, e.g., extrusion, injection molding, blow molding, rotomolding, overmolded or compression molding.

Preferred formation of the mobile electronic device component includes a suitable melt-processing method such as injection molding or extrusion molding of the polyamide composition, injection molding being a preferred shaping method.

Use of the Polyamide Composition or Article

In some embodiments, the polyamide composition or article can be used for manufacturing a mobile electronic device component, as described above.

Method for Reducing Warpage and/or Mold Shrinkage of a Polyamide Composition

Another aspect of the present invention relates to a method for reducing warpage and/or mold shrinkage in transverse direction of a molded article made from a polyamide composition, such method comprising blending the polyamide (PA1) and the polyamide (PA2) with the glass fiber, and optionally one or more optional components, to form a molding composition before subjecting the molding composition to molding, preferably injection molding, to form a molded article. The blending is preferably carried out by melt-blending as described above. The warpage and/or mold shrinkage in transverse direction of the molded article is reduced compared to that obtained for a molded article made from a similar polyamide composition containing same glass fiber and optional component(s) but only comprising the polyamide (PA1) or the polyamide (PA2).

EXAMPLES

The invention will now be described with reference to the following examples, whose purpose is merely illustrative and not intended to limit the scope of the invention. As used in the Examples, "E" denotes an example embodiment of the present invention and "CE" denotes a counter example.

The examples demonstrate improved mold shrinkage and warpage performance, excellent thermal properties, and excellent mechanical performance of the polyamide compositions.

Raw Materials

The raw materials used to form the samples as provided below:

- Polyamide "$PA1_a$": PA 6,T/10,T/1,3-BAC,T (Tg=125° C., Tm=315° C.) from Solvay Specialty Polymers USA—see synthesis details below
- Polyamide "$PA1_b$": PA6,T/10,T/6,CHDA/10,CHDA (Tg=128° C., Tm=321° C.) from Solvay Specialty Polymers USA—see synthesis details below
- Polyamide "$PA2_a$": PA10,T/10,I (Tg=105° C., Tm=295° C.) as Vicnyl 6100 from Kingfa
- Polyamide "$PA2_b$": PA6,10 (Tg=55° C., Tm=225° C.) as Radipol DC40 from Radici
- Polyamide "$PA2_c$": PA9,T (Tg=117° C., Tm=304° C.) as Genestar GC51010 from Kuraray
- Glass Fiber ("GF1")—CSG3PA flat E glass fiber, from Nittobo
- Glass Fiber ("GF2")—HM435TM round S-1 glass fiber, from Taishan
- Impact modifier: maleic anhydride grafted SEBS copolymer (KRATON® FG 1901 GT, from Kraton Corporation)
- Other Additives: Additive package containing a lubricant (calcium stearate Ceasit I from Baerlocher), a UV stabilizer (Chimassorb 944 LD from BASF) and a heat stabilizer (Irganox® B 1171 from BASF)
- Optional additives: pigments/dyes may be added to the polyamide compositions.

Polyamide "$PA1_a$": PA 6,T/10,T/1,3-BAC,T and Polyamide "$PA1_b$": PA6,T/10,T/6,CHDA/10,CHDA are two embodiments of the polyamide PA1.

Polyamide "$PA2_a$": PA10,T/10,I, Polyamide "$PA2_b$": PA6,10 and Polyamide "$PA2_c$": PA9,T are three embodiments of the polyamide PA2.

The respective Tg and Tm of PA6,T/10,T/1,3-BAC,T ($PA1_a$) and PA6,T/10,T/6,CHDA/10,CHDA ($PA1_b$) are higher than the respective Tg and Tm of PA10,T/10,I ($PA2_a$), PA6,10 ($PA2_b$) and PA9,T ($PA2_c$).

Synthesis of PA 6,T/10,T/1,3-BAC,T ($PA1_a$)

The following process was used to prepare PA 6,T/10,T/1,3-BAC,T. A stirred batch vessel was charged with deionized water; a diamine component consisting of hexamethylenediamine (HMDA), 1,10-diaminodecane (DMDA), and 1,3-bis(aminomethyl)cyclohexane (1,3-BAC) in amounts to achieve 57 mol. % HMDA, 35 mol. % DMDA, and 8 mol. % 1,3-BAC; and a dicarboxylic acid component consisting of terephthalic acid. The diamine component and the dicarboxylic acid component were equimolar. The reactor was also charged with phosphorus acid and glacial acetic acid. A salt solution was obtained by heating the above described mixture at 150° C. The contents were pumped continuously to a reactor zone maintained at about 180 psig and 220° C., then to a high pressure zone maintained at 300° C. and then through a tubular reactor at 100 psig heated to 350° C. The melt was fed into a twin-screw extruder equipped with a forward vacuum vent. The finished polymer was extruded through a strand die into a water bath and chopped into pellets.

Synthesis of PA 6,T/10,T/6,CHDA/10,CHDA ($PA1_b$)

The following process was used to prepare the copolyamide PA6,T/10,T/6,CHDA/10,CHDA. A stirred batch vessel was charged with 33.7 kg deionized water; a diamine component consisting of 21.58 kg of 70% HMDA, 14.47 kg of DMDA (corresponding to 65 mol. % HMDA and 35 mol. % DMDA); and a dicarboxylic acid component consisting of 2.71 kg of 1,4-cyclohexanedicarboxylic acid (CHDA) and 30.11 kg of terephthalic acid (corresponding to 8 mol. % CHDA and 92 mol. % terephthalic acid). The diamine component and the dicarboxylic acid component were equimolar. The reactor was also charged with 17.03 g phosphorus acid and 360.30 g of glacial acetic acid. A salt solution was obtained by heating the above described mixture at 150° C. The contents were pumped continuously to a reactor zone maintained at about 180 psig and 220° C., then to a high pressure zone maintained at 300° C. and then through a tubular reactor at 100 psig heated to 350° C. The melt was fed into a twin-screw extruder equipped with a forward vacuum vent. The finished polymer was extruded through a strand die into a water bath and chopped into pellets.

Test Methods

- Tensile properties were determined using ISO 527-2 on dumbbell-shaped, ISO type 1A tensile specimens with the following nominal dimensions: full length of 170 mm, gauge length of 75 mm, parallel section length of 80 mm, parallel section width of 10 mm, grip section width of 20 mm, and thickness of 4 mm. Properties were measured at 23° C., using 1 mm/minute test speed to measure modulus and 5 mm/minute afterwards to measure tensile strength and strain.
- Izod properties (notched-Izod, Un-notched-Izod) were determined using ISO 180 using 10 injection molded ISO type 1A bars (length of 80±2 mm, width of 10±0.2 mm, thickness of 4±0.2 mm).
- For mold shrinkage (mold shrinkage Flow Direction (%) and Transverse Direction (%)), plaques having dimensions of 60 mm×60 mm×2 mm were prepared by injection molding. Mold shrinkage was determined according to ASTM D955. Following molding and cooling, the widths of the plaques in the flow and transverse-flow directions were measured. The flow direction is defined by the direction into which the molten resin was injected into the mold and the transverse-flow direction is perpendicular across the surface of the plaque relative to the flow direction. The percentage by which the plaques had shrunk in each direction was calculated relative to the mold dimensions.
- Warpage is determined as follows: polyamide compositions were injection molded into plaques having dimensions of 60 mm×60 mm×2 mm according to ASTM D955, as detailed above. The warpage was calculated as the absolute value of the percent shrinkage in the transverse direction minus the percent shrinkage in the flow direction.
- Thermal properties were determined using DSC according to ASTM D3418 (TA Instruments DSC Q20 with nitrogen as carrier gas). A heat-cool-heat experiment was performed on pellets of each composition. Heating cooling rates of 20° C./min were used with a maximum temperature of 350° C.

Example 1-Polyamide Compositions with $PA1_a$, $PA2_a$, 30 wt. % E-Glass Flat Fiber In this example, $PA1_a$ (PA6,T/10,T/1,3-BAC,T) was compounded (melt-blended) with $PA2_a$ (PA10,T/10,I) in compositions containing 30 wt. % flat E-glass fiber (GF1). As shown in Table 1, the polyamide compositions of Samples E1 through E3 contained a blend of $PA1_a$ and $PA2_a$ with $PA1_a$ weight ratios of from 0.25 to 0.75 based on total $PA1_a$+$PA2_a$ weight. For comparison, Samples CE1, CE2 containing only PA1 or only $PA2_a$ were also prepared, the other components (GF1, additives) being the same and in same amounts. The melt-blending was carried out using a Coperion® ZSK-26 co-rotating twin-screw extruder and the compounded samples were subsequently molded according to ASTM D3641. Table 2 displays the mechanical properties including impact properties, and mold shrinkage of the compositions from Table 1.

TABLE 1

| Composition of Samples with $PA1_a$, $PA2_a$, 30 wt. % GF1 | | | | | |
|---|---|---|---|---|---|
| Component | E1 | E2 | E3 | CE1 | CE2 |
| $PA1_a$ – PA6, T/10, T/1, 3-BAC, T (wt. %) | 17.35 | 34.7 | 52.05 | 69.4 | — |
| $PA2_a$ – PA10, T/10, I (wt. %) | 52.05 | 34.7 | 17.35 | — | 69.4 |
| GF1 (wt. %) | 30 | 30 | 30 | 30 | 30 |
| Additives (wt. %) | 0.6 | 0.6 | 0.6 | 0.6 | 0.6 |

TABLE 1-continued

| Composition of Samples with $PA1_a$, $PA2_a$, 30 wt. % GF1 | | | | | |
|---|---|---|---|---|---|
| Component | E1 | E2 | E3 | CE1 | CE2 |
| $PA1_a$ weight ratio/total $PA1_a$ + $PA2_a$ | 0.25 | 0.5 | 0.75 | 1 | 0 |

Similar mechanical and impact performance was observed for all blend Samples E1-E3 compared to the Samples CE1 and CE2, suggesting that blending of $PA1_a$ and $PA2_a$ did not detrimentally impact mechanical performance. Clear improvement in the transverse mold shrinkage was observed by blending $PA1_a$ and $PA2_a$. The transverse mold shrinkage decreased (thereby was improving) as the $PA1_a$ weight ratio based on $PA1_a$+$PA2_a$ total weight approached 0.5 (Sample E2) from either 0 (Sample CE2) or 1 (Sample CE1). Thus, it was observed that mold shrinkage was improved while maintaining the mechanical performance of the $PA1_a$+$PA2_a$ blends that was observed with each of the individual $PA1_a$ or $PA2_a$ materials used.

TABLE 2

| Mechanical Properties of Samples with $PA1_a$, $PA2_a$, 30 wt. % GF1 | | | | | | |
|---|---|---|---|---|---|---|
| Property | Method | E1 | E2 | E3 | CE1 | CE2 |
| Tensile Modulus (GPa) | ISO 527-2 | 9.8 | 9.8 | 10.0 | 10.1 | 9.9 |
| Tensile Strength (MPa) | ISO 527-2 | 157 | 155 | 162 | 160 | 152 |
| Tensile Elongation at Break (%) | ISO 527-2 | 2.0 | 2.0 | 2.0 | 2.0 | 1.9 |
| Notched Izod (kJ/$m^2$) | ISO 180 | 8.7 | 8.7 | 8.2 | 8.1 | 8.6 |
| Unnotched Izod (kJ/$m^2$) | ISO 180 | 33.0 | 31.5 | 32.5 | 31.0 | 31.4 |
| Mold Shrinkage Flow Direction (%) | ASTM D955 | 0.23 | 0.23 | 0.28 | 0.34 | 0.26 |
| Mold Shrinkage Transverse Direction (%) | ASTM D955 | 0.79 | 0.66 | 0.74 | 0.92 | 0.84 |
| Warpage (%) | | 0.56 | 0.43 | 0.46 | 0.58 | 0.58 |

Example 2—Polyamide Compositions with $PA1_a$, $PA2_a$, High Strength Round GF2

In this example, $PA1_a$ (PA6,T/10,T/1,3-BAC,T) was compounded (melt-blended) with $PA2_a$ (PA10,T/10,I) in compositions containing 30 wt. % or 55 wt. % S-1 high modulus round glass fiber (GF2). As shown in Table 2, the polyamide compositions of Samples E4 through E7 contained a blend of $PA1_a$ and $PA2_a$ at $PA1_a$ weight ratios of from 0.1 to 0.5 based on $PA1_a$+$PA2_a$ total weight. For comparison, Samples CE3-CE6 containing only $PA1_a$ or only $PA2_a$ were also prepared, the other components (GF2, additives) being the same and in same amounts. Table 4 shows the mechanical properties, impact properties, mold shrinkage, and thermal properties of the compositions outlined in Table 3.

TABLE 3

| Composition of Samples with $PA1_a$, $PA2_a$, S-1 round GF2 | | | | | | | | |
|---|---|---|---|---|---|---|---|---|
| Component | E4 | E5 | E6 | E7 | CE3 | CE4 | CE5 | CE6 |
| $PA1_a$ – PA6, T/10, T/1,3-BAC, T (wt. %) | 6.9 | 17.4 | 34.7 | 22.2 | 69.4 | — | 44.4 | — |
| $PA2_a$ – PA10, T/10, I (wt. %) | 62.5 | 52.1 | 34.7 | 22.2 | — | 69.4 | | 44.4 |
| GF2 – S-1 (wt. %) | 30 | 30 | 30 | 55 | 30 | 30 | 55 | 55 |

TABLE 3-continued

| Composition of Samples with $PA1_a$, $PA2_a$, S-1 round GF2 | | | | | | | | |
|---|---|---|---|---|---|---|---|---|
| Component | E4 | E5 | E6 | E7 | CE3 | CE4 | CE5 | CE6 |
| Additives (wt. %) | 0.6 | 0.6 | 0.6 | 0.6 | 0.6 | 0.6 | 0.6 | 0.6 |
| Pigments (pph*) | 5.263 | 5.263 | 5.263 | 0.3 | 5.263 | 5.263 | 0.3 | 0.3 |
| $PA1_a$ weight ratio/total $PA1_a$ + $PA2_a$ | 0.1 | 0.25 | 0.5 | 0.5 | 1 | 0 | 1 | 0 |

*"pph" means parts per hundred by total weight of polyamide(s) + GF + additives.

As seen in Example 1, the tensile properties and Izod impact properties were consistent among samples at comparable glass fiber loadings. Samples E4-E7 containing blends of $PA1_a$ and $PA2_a$ displayed improvement in mold shrinkage relative to the comparative Samples CE3-CE7 containing only $PA1_a$ or only $PA2_a$. Similar to Example 1, the mold shrinkage decreased as the PA1 weight ratio approached 0.5 (i.e., equal weights of $PA1_a$ and $PA2_a$ in the samples).

For the 30% glass-filled samples E4-E6, the thermal properties of the compounds are also shown in Table 4. The Tg and Tm of the polyamide blend samples E4-E6 remained high and each had a Tg>100° C. and a Tm>285° C. Overall, the Tm values of Samples E4, E5, and E6 were close to that of Sample CE4, a formulation frequently used in applications requiring high temperature performance.

Figure 2:
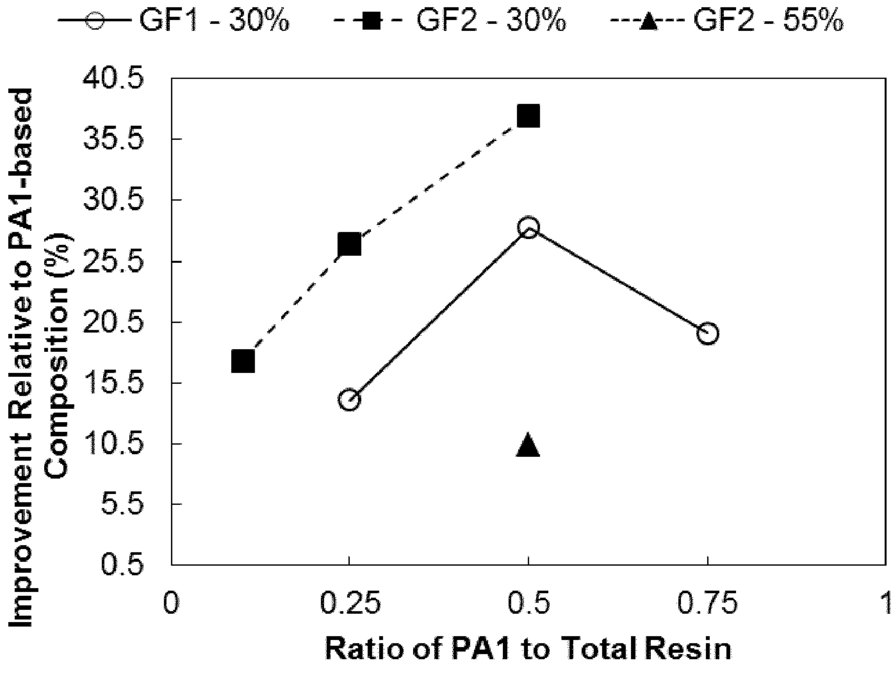
FIG. 2 represents the percent improvement in transverse shrinkage for each blend PA1+PA2 formulations relative to an equivalent formulation containing only PA1, with the glass fiber and optional components being the same.

FIG. 2 represents the percent improvement in transverse shrinkage for each blend $PA1_a$+$PA2_a$ formulations relative to an equivalent formulation containing only PA1.

Figure 3:
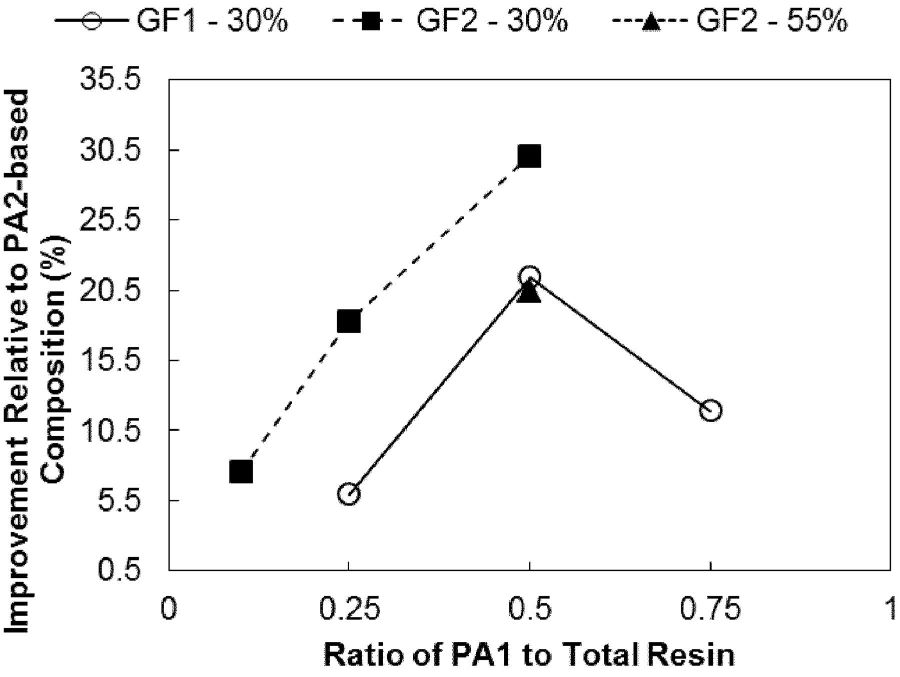
FIG. 3 represents the percent improvement in transverse shrinkage for each blend PA1+PA2 formulations relative to an equivalent formulation containing only PA2, with the glass fiber and optional components being the same.

FIG. 3 represents the percent improvement in transverse shrinkage for each blend $PA1_a$+$PA2_a$ formulations relative to an equivalent formulation containing only PA2.

These two FIGS. 2 and 3 illustrate that the transverse shrinkage improvement (up to ~40%) was the greatest when around equal parts of $PA1_a$ and $PA2_a$ ($PA1_a$ weight ratio=0.5) was used in the polyamide compositions. It was also noted that even when the loading of the minor PA component was low (e.g., at a $PA1_a$ weight ratio of 0.1), improvements in mold shrinkage were still observed.

From these FIGS. 2 and 3, it was also noted that the improvement in shrinkage was more noticeable at lower glass fiber loadings (30 wt. %) compared to higher glass fiber loadings (55 wt. %). It is believed to be due to an increased overall quantity of polyamides present in the formulations.

TABLE 4

| Mechanical Properties of Samples with $PA1_a$, $PA2_a$, S-1 round GF2 | | | | | | | | | |
|---|---|---|---|---|---|---|---|---|---|
| Property | Method | E4 | E5 | E6 | E7 | CE3 | CE4 | CE5 | CE6 |
| Tensile Modulus (GPa) | ISO 527-2 | 10.8 | 11.0 | 11.2 | 21.2 | 11.5 | 10.9 | 21.6 | 20.4 |
| Tensile Strength (MPa) | ISO 527-2 | 203 | 206 | 204 | 272 | 197 | 200 | 269 | 248 |
| Tensile Elongation at Break (%) | ISO 527-2 | 2.6 | 2.7 | 2.7 | 2.4 | 2.3 | 2.6 | 2.4 | 2.2 |
| Notched Izod ($kJ/m^2$) | ISO 180 | 11.7 | 11.5 | 11.5 | 18.6 | 10.3 | 11.2 | 17.0 | 14.3 |
| Unnotched Izod ($kJ/m^2$) | ISO 180 | 50.4 | 50.6 | 52.3 | 85.5 | 41.8 | 52.2 | 88.5 | 78.5 |
| Mold Shrinkage Flow Direction (%) | ASTM D955 | 0.15 | 0.12 | 0.09 | 0.07 | 0.2 | 0.15 | 0.14 | 0.13 |
| Mold Shrinkage Transverse Direction (%) | ASTM D955 | 0.86 | 0.76 | 0.65 | 0.78 | 0.98 | 0.93 | 0.87 | 0.98 |
| Warpage (%) | | 0.71 | 0.64 | 0.56 | 0.71 | 0.78 | 0.78 | 0.73 | 0.85 |
| Tg (° C.) | DSC | 113 | 115 | 118 | — | 127 | 110 | — | — |
| Tm (° C.) | DSC | 292 | 292 | 287 | — | 314 | 294 | — | — |
| ΔHm (J/g) | DSC | 53.6 | 47.9 | 37.7 | — | 50.1 | 57.7 | — | — |

These results suggest that blends of $PA1_a$ and $PA2_a$ can be used to effectively reduce the mold shrinkage properties while maintaining the high temperature profile and mechanical performance of the polyamide formulation.

FIG. 1 represents the transverse mold shrinkage of the polyamide blend compositions outlined in Examples 1 and 2 using two different types of glass fiber. It is shown that, regardless of glass fiber type and loading, an improvement in mold shrinkage was observed for blends of $PA1_a$ and $PA2_a$ relative to compositions containing only $PA1_a$ or only $PA2_a$. The greatest improvement in shrinkage was observed at equal weight loadings of $PA1_a$ and $PA2_a$.

Furthermore, at similar glass fiber loadings and same $PA1_a$ weight ratios, a greater improvement in transverse shrinkage was observed for compositions containing round glass fiber (GF2) versus flat glass fiber (GF1).

Example 3—Impact Modification of Polyamide Compositions

In certain applications, increased toughness may be required in addition to improved mold shrinkage. Table 5 outlines two compositions containing a blend of $PA1_a$ and $PA2_a$. Sample E9 contained an impact modifier while Sample E8 did not.

TABLE 5

Composition of Samples with or without impact modifier

| Component | E8 | E9 |
|---|---|---|
| $PA1_a$ – PA6, T/10, T/1, 3-BAC, T (wt. %) | 23.8 | 21.8 |
| $PA2_a$ – PA10, T/10, I (wt. %) | 35.6 | 32.6 |
| GF2-S-1 (wt. %) | 40 | 40 |
| Impact Modifier (wt. %) | — | 5 |
| Additives (wt. %) | 0.6 | 0.6 |
| Pigments (pph*) | 5.26 | 5.26 |
| $PA1_a$ weight ratio/ total $PA1_a$ + $PA2_a$ weight | 0.4 | 0.4 |

*"pph" means parts per hundred by total weight of polyamide(s) + GF + additives

TABLE 6

Mechanical Properties of Samples $PA1_a$ + $PA2_a$ + S-1 round GF2 with or without impact modifier

| Property | Method | E8 | E9 |
|---|---|---|---|
| Tensile Modulus (GPa) | ISO 527-2 | 14.1 | 13.1 |
| Tensile Strength (MPa) | ISO 527-2 | 235 | 211 |
| Tensile Elongation at Break (%) | ISO 527-2 | 2.9 | 3.3 |
| Notched Izod (kJ/m$^2$) | ISO 180 | 14.6 | 17.4 |
| Unnotched Izod (kJ/m$^2$) | ISO 180 | 86.8 | 95.1 |
| Mold Shrinkage Flow Direction (%) | ASTM D955 | 0.09 | 0.10 |
| Mold Shrinkage Transverse Direction (%) | ASTM D955 | 0.80 | 0.76 |
| Warpage (%) | | 0.71 | 0.66 |

As shown in Table 6, the addition of impact modifier to the polyamide blend composition in Sample E9 decreased the tensile modulus and tensile strength slightly (compared to in Sample E8 without impact modifier) while increasing the tensile elongation at break.

Furthermore, the notched and unnotched Izod properties were improved with the addition of impact modifier in Sample E9. Despite these changes in tensile and impact performance, the transverse mold shrinkage of the polyamide blend composition in Sample E9 remained relatively unchanged (if not better) following impact modification, while the warpage was improved (reduced) with the addition of impact modifier in Sample E9. This demonstrated that impact modification could be achieved while maintaining the improved mold shrinkage and warpage derived from the polyamide blend compositions.

Example 4—Polyamide Compositions $PA1_a$+$PA2_b$ with S-1 Round GF2

In this example, $PA1_a$ (PA6,T/10,T/1,3-BAC,T) was compounded (melt-blended) with $PA2_b$ (PA6,10) in compositions containing 30 wt. % S-1 high modulus round glass fiber (GF2). As shown in Table 7, the polyamide compositions of Samples E10 through E12 contained a blend of $PA1_a$ and $PA2_b$ at $PA1_a$ weight ratios of from 0.25 to 0.75 based on $PA1_a$+$PA2_b$ total weight. For comparison, Sample CE7 containing only $PA2_b$ and Sample CE8 containing only $PA1_a$ were also prepared, the other components (GF2, additives, pigment) being the same and in same amounts.

TABLE 7

Composition of Samples with $PA1_a$ + $PA2_b$ + S-1 round GF2

| Component | | E10 | E11 | E12 | CE7 | CE8 |
|---|---|---|---|---|---|---|
| $PA1_a$ – PA6, T/10, T/1,3-BAC, T | wt. % | 17.4 | 34.7 | 52.1 | — | 69.4 |
| $PA2_b$ – PA6, 10 | wt. % | 52.1 | 34.7 | 17.4 | 69.4 | — |
| S-1 round GF2 | wt. % | 30 | 30 | 30 | 30 | 30 |
| Additives | wt. % | 0.6 | 0.6 | 0.6 | 0.6 | 0.6 |
| Pigments | pph* | 0.3 | 0.3 | 0.3 | 0.3 | 0.3 |
| $PA1_a$ weight ratio/ total $PA1_a$ + $PA2_b$ | | 0.25 | 0.5 | 0.75 | 0 | 1 |

*"pph" means parts per hundred by total weight of polyamide(s) + GF + additives.

Table 8 shows the mechanical properties, impact properties, mold shrinkage, and thermal properties of the compositions outlined in Table 7.

TABLE 8

Properties of Samples with $PA1_a$ + $PA2_b$ + S-1 round GF2

| Property | Method | E10 | E11 | E12 | CE7 | CE8 |
|---|---|---|---|---|---|---|
| Tensile Modulus (GPa) | ISO 527-2 | 10.6 | 10.9 | 11.2 | 10.1 | 11.7 |
| Tensile Strength (MPa) | ISO 527-2 | 199 | 207 | 211 | 181 | 207 |
| Tensile Elongation at Break (%) | ISO 527-2 | 3.5 | 3.1 | 2.7 | 4.1 | 2.5 |
| Notched Izod (kJ/m$^2$) | ISO 180 | 13.3 | 12.4 | 11.7 | 15.7 | 13 |
| Unnotched Izod (kJ/m$^2$) | ISO 180 | 79.4 | 64.2 | 51.6 | 85.8 | 45.4 |
| Mold Shrinkage Flow Direction (%) | ASTM D955 | 0.16 | 0.19 | 0.22 | 0.19 | 0.23 |
| Mold Shrinkage Transverse Direction (%) | ASTM D955 | 0.66 | 0.58 | 0.63 | 0.83 | 1.10 |
| Warpage (%) | | 0.50 | 0.39 | 0.41 | 0.64 | 0.87 |
| Tg (° C.) | DSC | 53 | 61 | 86 | 55 | 126 |
| Tm (° C.) | DSC | 214*, 289 | 183, 294 | 297 | 225 | 314 |
| ΔHm (J/g) | DSC | 59.54 | 52.29 | 45.54 | 68.09 | 52.70 |

*in DSC traces means the largest peak

The tensile properties and notched Izod impact properties were fairly consistent among samples at comparable glass fiber loadings, with properties such as elongation at break and unnotched Izod impact scaling with the amount of more ductile aliphatic polyamide ($PA2_b$) in the system. Samples E10-E12 containing blends of $PA1_a$ and $PA2_b$ displayed improvement in mold shrinkage and warpage relative to the comparative Samples CE7-CE8 containing only $PA2_b$ or only $PA1_a$. Similar to Example 1, the mold shrinkage, especially in transverse direction, and the warpage decreased as the $PA1_a$ weight ratio approached 0.5 (i.e., equal weights of $PA1_a$ and $PA2_b$ in the samples).

For the 30% glass-filled samples E10-E12, the thermal properties of the compounds are also shown in Table 8. Because the Tg and Tm of the aliphatic $PA2_b$ (PA6,10) was much lower than $PA1_a$ (PA6,T/10,T/1,3-BAC,T), the resulting blend samples E10-E12 displayed thermal properties intermediate to the two polyamides, which are dependent on the relative weight ratio of each component. Despite this, the upper Tm remained quite high for each of the blends (>285° C.), suggesting use in high temperature applications. For the blends of the two polyamides, the enthalpy of melting was less than the major component (by weight ratio), suggesting that the improvement in mold shrinkage and warpage may be due to decreased crystallinity relative to CE7 and CE8, although not wishing to be bound by such hypothesis.

TABLE 9

Composition of Samples with $PA1_a$ + $PA2_c$ + S-1 round GF2

| Component | | E13 | E14 | E15 | CE9 | CE8 |
|---|---|---|---|---|---|---|
| $PA1_a$ – PA6, T/10, T/1,3-BAC, T | wt. % | 17.4 | 34.7 | 52.1 | — | 69.4 |
| $PA2_c$ – PA9, T | wt. % | 52.1 | 34.7 | 17.4 | 69.4 | — |
| S-1 round GF2 | wt. % | 30 | 30 | 30 | 30 | 30 |
| Additives | wt. % | 0.6 | 0.6 | 0.6 | 0.6 | 0.6 |
| Pigments | pph* | 0.3 | 0.3 | 0.3 | 0.3 | 0.3 |
| $PA1_a$ weight ratio/ total $PA1_a$ + $PA2_c$ | | 0.25 | 0.5 | 0.75 | 0 | 1 |

*"pph" means parts per hundred by total weight of polyamide(s) + GF + additives.

As seen in Example 1, the tensile properties and Izod impact properties were consistent among samples at comparable glass fiber loadings. Samples E13-E15 containing blends of PAL and PA24 with PAL weight ratios from 0.25 to 0.75 displayed improvement in transverse flow mold shrinkage and in warpage relative to the comparative Samples CE8 & CE9 containing only $PA1_a$ or only $PA2_c$D.

For the 30% glass-filled samples E13-E15, the thermal properties of the compounds are also shown in Table 10.

TABLE 10

Properties of Samples with $PA1_a$ + $PA2_c$ + S-1 round GF2

| Property | Method | E13 | E14 | E15 | CE9 | CE8 |
|---|---|---|---|---|---|---|
| Tensile Modulus (GPa) | ISO 527-2 | 10.5 | 10.5 | 10.4 | 10.5 | 11.7 |
| Tensile Strength (MPa) | ISO 527-2 | 195 | 172 | 167 | 142 | 207 |
| Tensile Elongation at Break (%) | ISO 527-2 | 2.5 | 2.1 | 2.1 | 1.8 | 2.5 |
| Notched Izod ($kJ/m^2$) | ISO 180 | 11.4 | 11.6 | 10.9 | 11.0 | 13 |
| Unnotched Izod ($kJ/m^2$) | ISO 180 | 42.9 | 46.7 | 40.1 | 29.6 | 45.4 |
| Mold Shrinkage Flow Direction (%) | ASTM D955 | 0.25 | 0.17 | 0.16 | 0.17 | 0.23 |
| Mold Shrinkage Transverse Direction (%) | ASTM D955 | 0.70 | 0.72 | 0.74 | 0.97 | 1.10 |
| Warpage (%) | | 0.45 | 0.55 | 0.58 | 0.80 | 0.87 |
| Tg (° C.) | DSC | 120 | 117 | 114 | 115 | 126 |
| Tm (° C.) | DSC | 314 | 305 | 277, 293 | 293, 306 | 314 |
| ΔHm (J/g) | DSC | 43.71 | 43.39 | 48.59 | 61.30 | 52.70 |

These results suggest that blends of $PA1_a$ and $PA2_b$ can be used to effectively reduce the mold shrinkage and warpage properties and warpage, while maintaining the high temperature profile and general mechanical performance of the polyamide formulation.

Example 5—Polyamide Compositions $PA1_a$+PA2c with S-1 Round GF2

In this example, $PA1_a$ (PA6,T/10,T/1,3-BAC,T) was compounded (melt-blended) with $PA2_c$, (PA9,T) in compositions containing 30 wt. % S-1 high modulus round glass fiber (GF2). As shown in Table 9, the polyamide compositions of Samples E13 through E15 contained a blend of $PA1_a$ and $PA2_c$ at $PA1_a$ weight ratios of from 0.25 to 0.75 based on $PA1_a$+$PA2_c$ total weight. For comparison, Sample CE9 containing only $PA2_c$ and Sample CE8 containing only $PA1_a$ were also prepared, the other components (GF2, additives, pigments) being the same and in same amounts. Table 10 shows the mechanical properties, impact properties, mold shrinkage, and thermal properties of the compositions outlined in Table 9.

As observed in Example 2, the Tg and Tm of the polyamide blend samples E13-E15 remained high and each had a Tg>110° C. and a Tm>290° C. Overall, the Tm values of Samples E13, E14, and E15 were close to or higher than that of Sample CE9, a material frequently used in applications requiring high temperature performance.

These results suggest that blends of $PA1_a$ and PA2, can be used to effectively reduce the mold shrinkage and warpage properties while maintaining the high temperature profile and mechanical performance of the polyamide formulation.

Example 6—Polyamide Compositions $PA1_b$+$PA2_a$ with S-1 Round GF2

In this example, $PA1_b$ (PA6,T/10,T/6,CHDA/10,CHDA) was compounded (melt-blended) with $PA2_a$ (PA10,T/10,I) in compositions containing 30 wt. % S-1 high modulus round glass fiber (GF2). As shown in Table 11, the polyamide compositions of Samples E16 & E17 contained a blend of $PA2_a$ and $PA1_b$ at $PA1_b$ weight ratios of 0.25 and 0.5 based on $PA2_a$+$PA1_b$ total weight. For comparison, Sample CE10 containing only $PA2_a$ and Sample CE11 containing only $PA1_b$ were also prepared, the other components (GF2, additives, pigments) being the same and in same amounts.

Table 12 shows the mechanical properties, impact properties, mold shrinkage, and thermal properties of the compositions outlined in Table 11.

TABLE 11

Composition of Samples with $PA1_b$ + $PA2_a$ + S-1 round GF2

| Component | | E16 | E17 | CE10 | CE11 |
|---|---|---|---|---|---|
| $PA1_b$ - PA6, T/10, T/6, CHDA/10, CHDA | wt. % | 17.4 | 34.7 | — | 69.4 |
| $PA2_a$-PA10, T/10, I | wt. % | 52.1 | 34.7 | 69.4 | — |
| S-1 round GF2 | wt. % | 30 | 30 | 30 | 30 |
| Additives | wt. % | 0.6 | 0.6 | 0.6 | 0.6 |
| Pigments | pph* | 0.3 | 0.3 | 0.3 | 0.3 |
| $PA1_b$ weight ratio/ total $PA1_b$ + $PA2_a$ | | 0.25 | 0.5 | 0 | 1 |

*"pph" means parts per hundred by total weight of polyamide(s) + GF + additives.

TABLE 12

Mechanical Properties of Samples with $PA1_b$ + $PA2_a$ + S-1 round GF2

| Property | Method | E16 | E17 | CE10 | CE11 |
|---|---|---|---|---|---|
| Tensile Modulus (GPa) | ISO 527-2 | 10.5 | 10.7 | 10.6 | 11 |
| Tensile Strength (MPa) | ISO 527-2 | 188 | 194 | 189 | 198 |
| Tensile Elongation at Break (%) | ISO 527-2 | 2.5 | 2.6 | 2.5 | 2.6 |
| Notched Izod (kJ/m$^2$) | ISO 180 | 12.1 | 12 | 12.2 | 11.3 |
| Unnotched Izod (kJ/m$^2$) | ISO 180 | 52 | 50.9 | 50.9 | 42.2 |
| Mold Shrinkage Flow Direction (%) | ASTM D955 | 0.12 | 0.13 | 0.15 | 0.17 |
| Mold Shrinkage Transverse Direction (%) | ASTM D955 | 0.91 | 0.96 | 1.04 | 1.06 |
| Warpage (%) | | 0.80 | 0.83 | 0.89 | 0.89 |
| Tg (° C.) | DSC | 109 | 110 | 107 | 117 |
| Tm (° C.) | DSC | 291 | 281*, 311 | 295 | 321 |
| ΔHm (J/g) | DSC | 61.02 | 63.01 | 69.21 | 68.91 |

*in DSC trace means the largest peak

The tensile properties and Izod impact properties of Samples E16-E17 were consistent among samples at comparable glass fiber loadings. Samples E16-E17 containing blends of $PA1_b$ and $PA2_a$ displayed improvement in mold shrinkage and warpage relative to the comparative Samples CE10-CE11 containing only $PA2_a$ or only $PA1_b$. Similar to Example 1, the mold shrinkage decreased as the $PA1_b$ weight ratio approached 0.5 (i.e., equal weights of $PA1_b$ and $PA2_a$ in the samples).

For the 30% glass-filled samples E16-E17, the thermal properties of the compounds are also shown in Table 12. The Tg and Tm of the polyamide blend samples E16 and E17 remained high and each had a Tg>100° C. and a Tm>280° C. Overall, the Tm values of Samples E16 and E17 were close to that of Sample CE10 (a similar composition to CE4), a formulation frequently used in applications requiring high temperature performance. Again a decrease in the enthalpy of melting was observed for the polyamide blends relative to CE10 and CE11, suggesting that this may be contributing to the improved shrinkage and warpage observed.

These results suggest that blends of $PA1_b$ and $PA2_a$ can be used to effectively reduce the mold shrinkage and warpage properties while maintaining the high temperature profile and mechanical performance of the polyamide formulation.

While preferred embodiments of this invention have been shown and described, modifications thereof can be made by one skilled in the art without departing from the spirit or teaching of this invention. The embodiments described herein are exemplary only and are not limiting. Many variations and modifications of compositions, articles, and methods are possible and are within the scope of the invention. Accordingly, the scope of protection is not limited by the description set out above, but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. Any incorporation by reference of documents above is limited such that no subject matter is incorporated that is contrary to the explicit disclosure herein.

The disclosure of all patent applications, and publications cited herein are hereby incorporated by reference, to the extent that they provide exemplary, procedural or other details supplementary to those set forth herein. Should the disclosure of any patents, patent applications, and publications which are incorporated herein by reference conflict with the description of the present application to the extent that it may render a term unclear, the present description shall take precedence.

The invention claimed is:

1. A polyamide composition comprising:

a polyamide (PA1), a polyamide (PA2) having a glass transition temperature Tg which is lower than the Tg of the polyamide (PA1) and/or having a melting temperature Tm which is lower than the Tm of the polyamide (PA1), and from 15 percent by weight (wt. %) to 60 wt. % of a glass fiber, said wt. % being based on the total weight of the polyamide composition, wherein the polyamide composition has a PA1 weight ratio of at least 0.05 and at most 0.95, said PA1 weight ratio being calculated as the weight of PA1 in the polyamide composition based on the combined weights of PA1 and PA2 in the polyamide composition, wherein the polyamide (PA1) is a copolyamide comprising:

recurring units ($R_{PA1}$) of formula (1), ($R_{PA2}$) of formula (2), and ($R_{PA3}$) of formula (3) or (4):

(1)

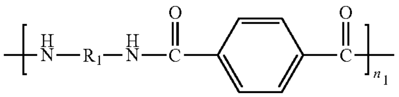

(2)

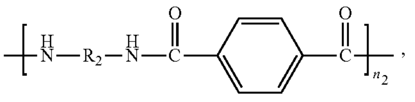

(3)

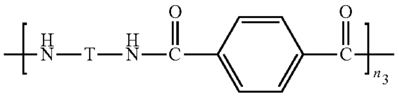

(4)

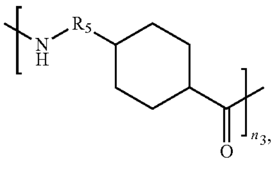

wherein $n_1$ to $n_3$ are mol. % of recurring units ($R_{PA1}$), ($R_{PA2}$) and ($R_{PA3}$), respectively;

or a copolyamide comprising:

recurring units ($R_{PA1}$) of said formula (1), ($R_{PA2}$) of said formula (2), ($R_{PA3*}$) of formula (5), and ($R_{PA4*}$) of formula (6), (5)

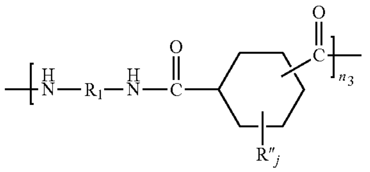

(6)

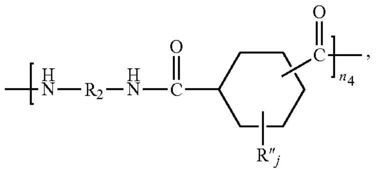

wherein $n_1$ to $n_4$ are mol. % of recurring units ($R_{PA1}$) ($R_{PA2}$), ($R_{PA3*}$), and ($R_{PA4*}$), respectively ($n_1+n_2+n_3+n_4 \leq 100$ mol. %);

and wherein $R_1$ is a $C_4$ to $C_8$ aliphatic alkylene;

$R_2$ is a $C_9$ to $C_{12}$ aliphatic alkylene group;

$R_5$ is a $C_1$ to $C_3$ alkylene group;

R", at each location, is independently selected from the group consisting of an alkyl, an aryl, an alkali or alkaline earth metal sulfonate, an alkyl sulfonate, and a quaternary ammonium;

j is an integer from 0 to 10;

T in Formula (3) is represented by either one of the following formulae (7) or (8):

(7)

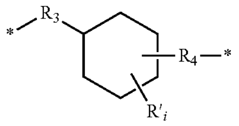

(8)

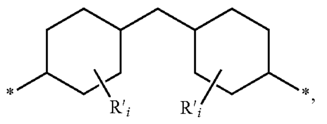

wherein $R_3$ and $R_4$, are independently selected from the group consisting of a bond and a $C_1$ to $C_{10}$ alkylene groups;

R', at each location, is independently selected from the group consisting of an alkyl, an aryl, an alkali or alkaline earth metal sulfonate, an alkyl sulfonate, and a quaternary ammonium; and each i is an independently selected integer from 0 to 10; and the '*' denotes a bond to one of the two explicit nitrogen atoms in Formula (3).

2. The polyamide composition of claim 1, wherein the recurring units ($R_{PA1}$) and ($R_{PA2}$) are formed from polycondensation of hexamethylenediamine and 1,10-diaminodecane with terephthalic acid.

3. The polyamide composition of claim 1, wherein the recurring unit ($R_{PA3}$) is formed from:

polycondensation of terephthalic acid with either 1,3-bis(aminomethyl)cyclohexane (1,3-BAC) or 1,4-bis(aminomethyl)cyclohexane (1,4-BAC); or polycondensation of 4-aminomethylcyclohexanecarboxylic acid (4-AMCC); or wherein the recurring units ($R_{PA3*}$) and ($R_{PA4*}$) are formed from polycondensation of hexamethylenediamine and 1,10-diaminodecane with 1,4-cyclohexane dicarboxylic acid (1,4-CHDA).

4. The polyamide composition of claim 1, wherein, when the polyamide (PA1) comprises recurring units ($R_{PA1}$) of formula (1), ($R_{PA2}$) of formula (2), and ($R_{PA3}$) of formula (3) or (4), $n_1+n_2+n_3$ is at least 50 mol. % based on the total number of recurring unit in the polyamide (PA1) and $n_3$ in ($R_{PA3}$) is greater than 0.5 mol. %; or when the polyamide (PA1) comprises recurring units ($R_{PA1}$) of formula (1), ($R_{PA2}$) of formula (2), ($R_{PA3*}$) of formula (5), and ($R_{PA4*}$) of formula (6), $n_1+n_2+n_3+n_4$ is at least 50 mol. % based on the total number of recurring units in the polyamide (PA1), and $n_3$ in ($R_{PA3*}$) and/or $n_4$ in ($R_{PA4*}$) is greater than 0.5 mol. %.

5. The polyamide composition of claim 1, wherein the polyamide (PA2) has a glass temperature Tg of at least 50° C. and/or a melting temperature Tm of at least 220° C.

6. The polyamide composition of claim 1, wherein the polyamide (PA2) comprises a semi-aromatic polyamide.

7. The polyamide composition of claim 1, wherein the polyamide (PA2) is selected from the group consisting of PA10,T/10,I; PA10,T; PA6, T/6,I; PA6,T; PA9,T; PAMXD6; PAPXD10; and any combination thereof.

8. The polyamide composition of claim 1, wherein the PA1 weight ratio is at least 0.1 and/or at most 0.9.

9. The polyamide composition of claim 1, wherein the glass fiber concentration in the polyamide composition is from 20 wt. % to 55 wt. %, based on the total weight of the polyamide composition.

10. The polyamide composition of claim 1, wherein the glass fiber is a round or flat glass fiber selected from the group consisting of:

E-glass fiber;

low $D_k$ glass fiber having a dielectric constant of 4.0 to 5.5 at a frequency of 1 MHz measured according to ASTM D150;

high modulus glass fiber having a tensile modulus of at least 76 GPa as measured according to ASTM D2343; and combinations thereof.

11. The polyamide composition of claim 1, having a glass transition temperature Tg of at least 50° C. and/or no more than 150° C., and a melting temperature Tm of at least 180° C. and/or no more than 340° C., wherein the Tg and Tm are measured according to ASTM D3418.

12. The polyamide composition of claim 1, further comprising at least one optional component selected from the group consisting of tougheners, plasticizers, light stabilizers, ultra-violet stabilizers, heat stabilizers, pigments, dyes, anti-static agents, flame retardants, impact modifiers, lubricants, nucleating agents, antioxidants, processing aids, and any combination of two or more thereof.

13. A method for making the polyamide composition of claim 1, comprising melt-blending the polyamide (PA1), the polyamide (PA2), the glass fiber and any optional component selected from the group consisting of a reinforcing agent different than the glass fiber, tougheners, plasticizers, light stabilizers, ultra-violet stabilizers, heat stabilizers, pigments, dyes, antistatic agents, flame retardants, impact modifiers, lubricants, nucleating agents, antioxidants, processing aids, and any combination of two or more thereof.

14. A molded article comprising the polyamide composition of claim 1, having a reduced transverse shrinkage and/or warpage compared to polyamide compositions containing only the polyamide (PA1) or only the polyamide (PA2), the other components being the same.

15. A mobile electronic device component comprising the polyamide composition of claim 1.

16. The mobile electronic device component of claim 15, being an antenna, an antenna window, an antenna housing or a mobile electronic housing.

17. The polyamide composition of claim 1, wherein the polyamide (PA2) comprises a polyphthalamide.

18. The polyamide composition of claim 1, further comprising at least one impact modifer.

* * * * *